US012197186B2

(12) United States Patent
Sirovskiy et al.

(10) Patent No.: US 12,197,186 B2
(45) Date of Patent: *Jan. 14, 2025

(54) SYSTEMS AND METHODS FOR DESIGNING AND MANUFACTURING AN ORTHODONTIC APPLIANCE

(71) Applicant: Ormco Corporation, Orange, CA (US)

(72) Inventors: Yevgeniy Sirovskiy, Castro Valley, CA (US); Artem Borovinskih, San Jose, CA (US); Mithil J. Shah, North Hills, CA (US); Ilia Ankudinov, Moscow (RU)

(73) Assignee: Ormco Corporation, Brea, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 17/126,632

(22) Filed: Dec. 18, 2020

(65) Prior Publication Data

US 2021/0271225 A1 Sep. 2, 2021

Related U.S. Application Data

(63) Continuation of application No. 16/168,075, filed on Oct. 23, 2018, now Pat. No. 10,935,958.

(51) Int. Cl.
*G05B 19/4099* (2006.01)
*G06T 19/20* (2011.01)

(52) U.S. Cl.
CPC .......... *G05B 19/4099* (2013.01); *G06T 19/20* (2013.01); *G05B 2219/35134* (2013.01);
(Continued)

(58) Field of Classification Search
CPC ...... G05B 19/4099; G05B 2219/35134; G05B 2219/49004; G06T 19/20; G06T 2210/41; G06T 2219/2004; A61C 7/002; A61C 7/08
(Continued)

(56) References Cited

U.S. PATENT DOCUMENTS 7,711,447 B2 5/2010 Lu et al.
8,155,780 B2 4/2012 Lu et al.
(Continued)

FOREIGN PATENT DOCUMENTS

WO WO-9806347 A1 * 2/1998 ............. A61C 7/145

OTHER PUBLICATIONS

International Searching Authority, International Search Report and Written Opinion in corresponding International Application No. PCT/US2019/057414 dated Jan. 3, 2020.
(Continued)

*Primary Examiner* — Thomas C Lee
*Assistant Examiner* — Michael Tang
(74) *Attorney, Agent, or Firm* — Wood Herron & Evans LLP

(57) ABSTRACT

Systems and methods of defining a trimline in relation to modeled teeth including modeled gingiva. The trimline is for use to manufacture an aligner. A margin point is placed proximate a gingival margin at each tooth on at least one jaw in the model. A trimline connects the plurality of margin points from which machine code is generated. The aligner manufactured includes an edge that correlates with the trimline according to the machine code. A margin point may be proximate a gingival zenith. At least one tooth cooperates with the modeled gingiva to define a line around the tooth. The trimline includes at least one tooth curve and at least one connector curve connected to the tooth curve at a transition point. At least one control point is on the trimline between two margin points. The trimline is defined by a spline that may be a Bézier curve.

40 Claims, 19 Drawing Sheets

(52) U.S. Cl.
 CPC ............... *G05B 2219/49004* (2013.01); *G06T 2210/41* (2013.01); *G06T 2219/2004* (2013.01)

(58) Field of Classification Search
 USPC .............................. 700/98; 264/16; 433/6, 24
 See application file for complete search history.

(56) References Cited

U.S. PATENT DOCUMENTS

| | | | |
|---|---|---|---|
| 8,764,445 B1* | 7/2014 | DeLuca | A61C 13/235 433/191 |
| 2002/0055081 A1 | 5/2002 | Hughes et al. | |
| 2004/0197728 A1* | 10/2004 | Abolfathi | A61C 7/00 433/24 |
| 2007/0072144 A1 | 3/2007 | Imgrund et al. | |
| 2008/0182220 A1 | 7/2008 | Chishti et al. | |
| 2008/0187887 A1* | 8/2008 | Lu | G16H 20/40 433/215 |
| 2009/0098502 A1 | 4/2009 | Andreiko | |
| 2010/0281370 A1* | 11/2010 | Rohaly | G06T 15/205 715/810 |
| 2011/0045428 A1 | 2/2011 | Boltunov et al. | |
| 2011/0137626 A1* | 6/2011 | Matov | A61C 7/08 703/2 |
| 2013/0089828 A1 | 4/2013 | Borovinskih et al. | |
| 2013/0177864 A1* | 7/2013 | Hultgren | A61B 5/742 433/29 |
| 2013/0317800 A1 | 11/2013 | Wu et al. | |
| 2013/0325431 A1 | 12/2013 | See et al. | |
| 2014/0067335 A1 | 3/2014 | Andreiko | |
| 2014/0272772 A1 | 9/2014 | Andreiko et al. | |
| 2015/0282904 A1 | 10/2015 | Fisker | |
| 2017/0079748 A1 | 3/2017 | Andreiko | |
| 2018/0078336 A1 | 3/2018 | Andreiko | |
| 2018/0116762 A1* | 5/2018 | Kopelman | A61C 7/08 |
| 2018/0165818 A1 | 6/2018 | Tsai et al. | |
| 2019/0102880 A1* | 4/2019 | Parpara | A61C 7/002 |
| 2019/0350680 A1 | 11/2019 | Chekh et al. | |
| 2020/0015936 A1 | 1/2020 | Ye et al. | |
| 2020/0015943 A1 | 1/2020 | Reynard et al. | |
| 2020/0100871 A1* | 4/2020 | Wang | B29C 33/3835 |
| 2020/0125069 A1 | 4/2020 | Sirovskiy et al. | |
| 2021/0196430 A1 | 7/2021 | Wilson et al. | |

OTHER PUBLICATIONS

Roger Wu, Automated Data Processing, https://www.youtube.com/watch?v=2phc584dHlg&feature=youtu.be, published on Jul. 15, 2020.
U.S. Patent and Trademark Office, Office Action issued in corresponding U.S. Appl. No. 16/168,075 mailed on Mar. 26, 2020.
U.S. Patent and Trademark Office, Notice of Allowance issued in corresponding U.S. Appl. No. 16/168,075 mailed on Oct. 28, 2020.
PCT Office, International Preliminary Report on Patentability issued in PCT/US2022/019732 dated Sep. 12, 2023.
European Patent Office, Examination Report issued in EP 19802389.7 dated May 25, 2023.
PCT Office, International Preliminary Report on Patentability issued in PCT/US2019/057414 mailed on Apr. 27, 2021.
PCT Office, Search Report and Written Opinion issued in PCT/US2022/019732 dated Jul. 18, 2022.
European Patent Office, Examination Report, Application No. EP22713208.1, dated Nov. 4, 2024 (4 pages).

* cited by examiner

SYSTEMS AND METHODS FOR DESIGNING AND MANUFACTURING AN ORTHODONTIC APPLIANCE

CROSS REFERENCE TO RELATED APPLICATION

This application is a continuation of U.S. patent application Ser. No. 16/168,075, filed Oct. 23, 2018, the disclosure of which is incorporated by reference herein in its entirety.

TECHNICAL FIELD

The present invention relates generally to the field of orthodontic treatment and, more particularly, to systems and methods of manufacturing orthodontic appliances.

BACKGROUND

Orthodontics is the practice of manipulating teeth to correct malocclusions between the teeth of the upper and lower dental arches. Typically, treatment of malocclusions includes the use of an orthodontic appliance that applies corrective forces to the teeth. Over time, these corrective forces coerce the teeth to move into their orthodontically correct positions.

One way of applying corrective forces is with orthodontic brackets. Treatment using brackets includes attaching a bracket to each of the teeth being treated. These brackets are then coupled to an archwire. The archwire may be coupled to the brackets using ligatures. Ligatures are small elastomeric o-rings that retain the archwire within a slot of the bracket. The archwire is resilient and exerts corrective forces on the teeth via the brackets. During treatment with brackets, the patient must periodically visit the orthodontist to replace the archwire with a new archwire which is typically larger in cross-sectional dimension.

As an alternative to braces, which remain adhered to the patient's teeth during the entire treatment, orthodontists may utilize orthodontic appliances referred to as "dental aligners," or simply "aligners." Aligners are generally supplied as a series of removable appliances that incrementally reposition the patient's teeth from their initial orientation to their orthodontically correct orientation. Patients being treated with aligners can insert and remove the aligners at will, and therefore do not need to visit the orthodontist for adjustments. Rather, when the currently worn aligner has moved the teeth to at or near a final orientation for that aligner, the patient merely begins using the next aligner in the series according to a treatment plan.

To fabricate aligners, the orthodontist first obtains a computer model of the patient's dentition. This model may be generated, for example, by taking an impression of the dentition and scanning the impression into a computer. Alternatively, the clinician may directly scan the patient's teeth with an intraoral scanner. The scanned data is then used to construct the computer model. Once the computer model has been obtained, the orthodontist may determine a target orientation of the teeth that provides a corrected dentition. Multiple computer models may then be generated, with each model corresponding to an incremental orientation of the dentition from an initial orientation to a target orientation. The incremental orientations from initial to target orientations may move the patient's teeth according to a proposed treatment plan. Treatment plans typically include numerous stages of movement from an initial orientation to a target orientation of the teeth. Depending on the degree of tooth movement, treatment plans may include a number of aligners that are worn in a predetermined sequence from an initial orientation to a final orientation.

Fabrication of the aligners typically involves forming plastic sheets onto a mold constructed of target orientations of the dentition according to the computer models. After each aligner is formed, excess material must be trimmed from it. However, due to the complex shapes and relatively small sizes of human dentition, this trimming task is difficult. Methods of trimming away a waste portion of the sheet from the aligner include manual trimming with scissors, which is time consuming and requires significant skill. Trimming using a Computer Numeric Control (CNC) milling machine has also been attempted. However, using a CNC milling machine involves a complicated setup procedure that is both expensive and that must be implemented for each aligner being trimmed. A trimline implemented may change for each aligner or for groups of aligners for each patient. Moreover, when CNC milling is used, a certain percentage of the aligners cannot be completely separated by CNC milling alone due to spatial limitations in the milling process. And, there are other problems, as machined aligners often require subsequent processing to improve the edge quality, for example, to remove burrs and round sharp edges produced during CNC milling.

Not only are there problems with CNC milling, clinicians may have particular preferences for their patients and so may manually modify aligners in accordance with those preferences. While these modifications are made with good intentions, the resultant aligner often has less than optimum performance. Ultimately, manual field modifications often prolong treatment and so are made at the expense of the patient.

These difficulties are exacerbated by recent advancements in aligner technology. Devices, such as attachments and buttons over which an aligner fits, often reduce the spatial accessibility of milling tools to accurately CNC mill the aligner edge in the region of the attachment or button. The difficulties in trimming caused by attachments and devices restrict placement of these devices. With these machining limitations in mind, the design of the aligner may be compromised to maintain manufacturability. Further, clinicians sometimes modify aligners to facilitate the use of the aligner with a secondary appliance in conjunction with the aligner.

While generally successful, there remain problems in the manufacturing of aligners. Thus, improved methods, systems, and computer program products are needed in the fabrication of aligners.

SUMMARY

The present invention overcomes the shortcomings and drawbacks of methods and systems for modeling and manufacturing of aligners heretofore known for use in orthodontic treatment. While the invention will be described in connection with certain embodiments, it will be understood that the invention is not limited to those embodiments. On the contrary, the invention includes all alternatives, modifications and equivalents as may be included within the spirit and scope of the present invention.

In accordance with the principles of the present invention, there is a computer-implemented method of defining a trimline in relation to a 3-D digital model of teeth including modeled gingiva. The trimline is for use in the manufacturing of an aligner. The method includes placing a margin point proximate a gingival margin at each tooth on at least one jaw in the 3-D digital model. The method further includes generating a trimline connecting the plurality of margin points and generating machine code from the trimline.

In one embodiment, the method further includes manufacturing the aligner and wherein an edge of the aligner is configured to correlate with the trimline according to the machine code.

In one embodiment, during placing, at least one margin point is proximate a gingival zenith on at least one tooth.

In one embodiment, at least one tooth in the 3-D digital model cooperates with the modeled gingiva to define a line around the at least one tooth, and the trimline includes at least one tooth curve and at least one connector curve connected to the at least one tooth curve at a transition point, the tooth curve being defined in at least one of curvature and location by the line around the at least one tooth and passing through at least one margin point.

In one embodiment, the method further includes adding at least one control point on the trimline between two margin points.

In one embodiment, the trimline is defined by a spline between at least one margin point of the two margin points and the at least one control point.

In one embodiment, the method further includes adding a vector on the trimline between the at least one control point and the at least one margin point, wherein the vector is configured to alter the curvature of the spline.

In one embodiment, the spline is a Bèzier curve.

In one embodiment, the method further includes moving the at least one control point occlusally relative to the two margin points and wherein the trimline follows the control point.

In one embodiment, the control point is proximate an interproximal region between adjacent teeth.

In one embodiment, following moving the at least one control point, the method further includes validating the trimline between the two margin points, including through the at least one control point, against at least one predetermined parameter.

In one embodiment, the at least one predetermined parameter includes one or more of a minimum clinical radius, a minimum tool radius, and a minimum labial-lingual distance.

In one embodiment, after validating, the method includes determining that the trimline is invalid.

In one embodiment, after determining, the method includes moving at least one of the at least one control point and one of the two margin points and repeating validating.

In one embodiment, the method further includes moving all of the margin points occlusally or gingivally by a margin parameter.

According to one aspect, in one embodiment, there is a system for defining a trimline in relation to a 3-D digital model of teeth including modeled gingiva. The trimline is for use in the manufacturing of an aligner. The system includes a processor and a memory including program code. The processor is configured by the program code to place a margin point proximate a gingival margin at each tooth on a jaw in the 3-D digital model, generate a trimline connecting the margin points, and generate machine code from the trimline.

In one embodiment, during placement, at least one margin point is placed proximate a gingival zenith on at least one tooth.

In one embodiment, at least one tooth in the 3-D digital model cooperates with the modeled gingiva to define a line around the at least one tooth and wherein the trimline includes at least one tooth curve and at least one connector curve connected to the at least one tooth curve at a transition point, the tooth curve being defined in at least one of curvature or location by the line around the at least one tooth and passing through at least one margin point.

In one embodiment, the processor is configured by the program code to place at least one control point on the trimline between two margin points.

In one embodiment, the processor is configured by the program code to define the trimline as a spline between at least one margin point of the two margin points and the at least one control point.

In one embodiment, the processor is configured by the program code to add a vector on the trimline between the at least one control point and one of the two margin points, wherein the vector is configured to alter the curvature of the spline.

In one embodiment, the spline is a Bèzier curve.

In one embodiment, the processor is configured by the program code to move the at least one control point occlusally relative to the two margin points and wherein the trimline follows the at least one control point.

In one embodiment, the processor is configured by the program code to validate the trimline against at least one predetermined parameter after moving the at least one control point.

In one embodiment, the at least one predetermined parameter includes one or more of a minimum clinical radius, a minimum tool radius, and a minimum labial-lingual distance.

In one embodiment, the processor is configured by the program code to indicate that the trimline is invalid after validating.

In one embodiment, the processor is configured by the program code to move the margin points occlusally or gingivally by a margin parameter.

In one embodiment, the system further includes a manufacturing system in which the machine code is usable to form an edge of an aligner.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

DETAILED DESCRIPTION

Figure 1:
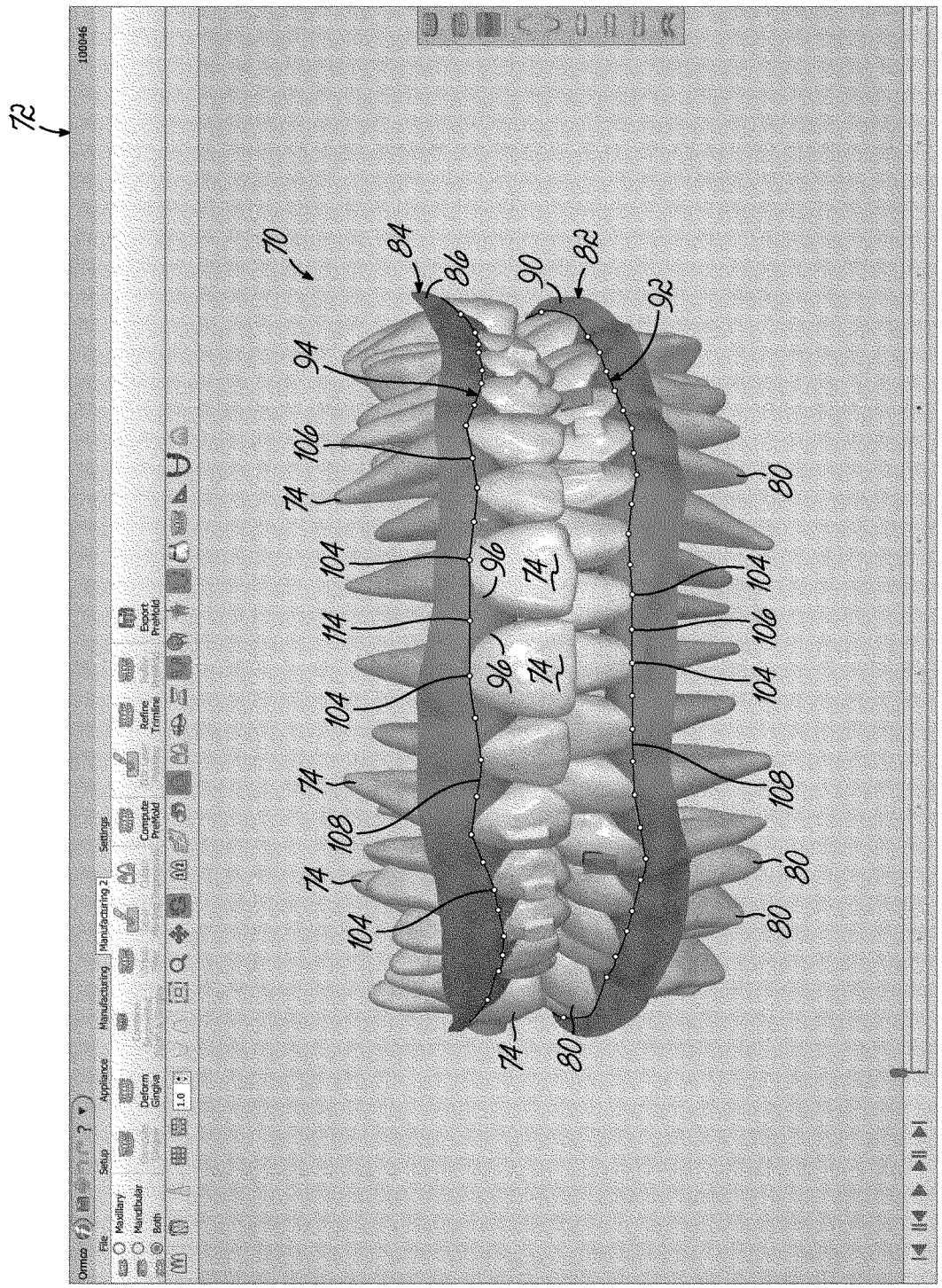
FIG. 1 is a 3-D tooth model displayed in a system according to one embodiment of the invention.

Embodiments of the invention are directed to computer-implemented methods, systems, and computer program products for fabricating dental aligners. In particular, embodiments of the invention are utilized to digitally produce a trimline. The digital trimline defines a tool path by which a waste portion of a workpiece is cut away from an aligner portion of the workpiece after forming. For example, a machine tool, which may be coupled to a CNC milling machine, may be used to cut the workpiece during a trimming process. The machine tool removes material during the cutting process to reproduce the digital trimline as an edge of an aligner. The edge of the aligner affects patient comfort and can influence aligner performance.

Advantageously, embodiments of the invention reduce or eliminate any necessity for manual modification of the edges of one or more aligners in a series of aligners after those aligners are produced. Embodiments of the invention provide a clinician, such as an orthodontist, a staff member under instruction by the orthodontist, or an orthodontic device manufacturer, with the capability for digitally producing a trimline and modifying all or portions of the digital trimline prior to producing an aligner. Creating the trimline digitally with reference to the patient's teeth permits manual modification of the trimline to address patient specific problems. Thus, a plurality of modifications can be made and then assessed prior to manufacturing the aligner. In embodiments of the invention, once an initial trimline is defined, the initial trimline can be edited based on clinical needs. The edited, initial trimline may be automatically morphed onto multiple aligners to account for the predicted movement of the patient's teeth during treatment according to a treatment plan. Each trimline, whether constructed from a morphing process or manually created may be subject to manual editing and automatic validation.

In exemplary embodiments, according to one aspect, there is a method of creating, editing, and producing a digital trimline. The clinician uses a computer system to create and edit the position of the digital trimline relative to a three-dimensional model of the patient's teeth. The digital trimline and the clinician's modifications are continuously evaluated against predetermined parameters, described below, including any spatial limitations inherent in automated machining, such as CNC machining, and the predicted structural integrity of an aligner produced according to the digital trimline. The predetermined parameters guide the clinician in the development of a valid trimline, one that is machinable and also provides the necessary structural integrity for producing tooth movement, among other factors.

When the digital trimline approaches and/or violates any single one of the predetermined parameters, the system warns the clinician as to the problem portion of the digital trimline. The system provides the warning in near real time as the edit is made and indicates the portion of the digital trimline that is in violation of one or more of the predetermined parameters. The clinician may then reconsider the edit and/or readjust the digital trimline to address the warning. The clinician's edits may occur on a continuous basis while subjectively assessing the effect of those modifications on the patient's comfort and the effectiveness of treatment with an aligner produced with the digital trimline. In this way, the clinician has the capability to both simultaneously address specific problems associated with a patient's teeth, address any attachments or devices that may be used during orthodontic treatment, and incorporate their personal preferences in real time while satisfying predetermined parameters to produce a usable trimline.

To these and other ends, and with reference to FIGS. 1-4A, embodiments of the present invention may include systems and methods that use computers to model a patient's teeth, to prepare orthodontic treatment plans, and to design aligners based on the treatment plans. These systems provide an interface through which a clinician or other orthodontic specialist can create, edit, and communicate treatment plans, as well as implement design preferences and output data. Embodiments of the present invention enhance systems and improve the functionality and utility of such systems and methods, as set forth herein.

Figure 1A:
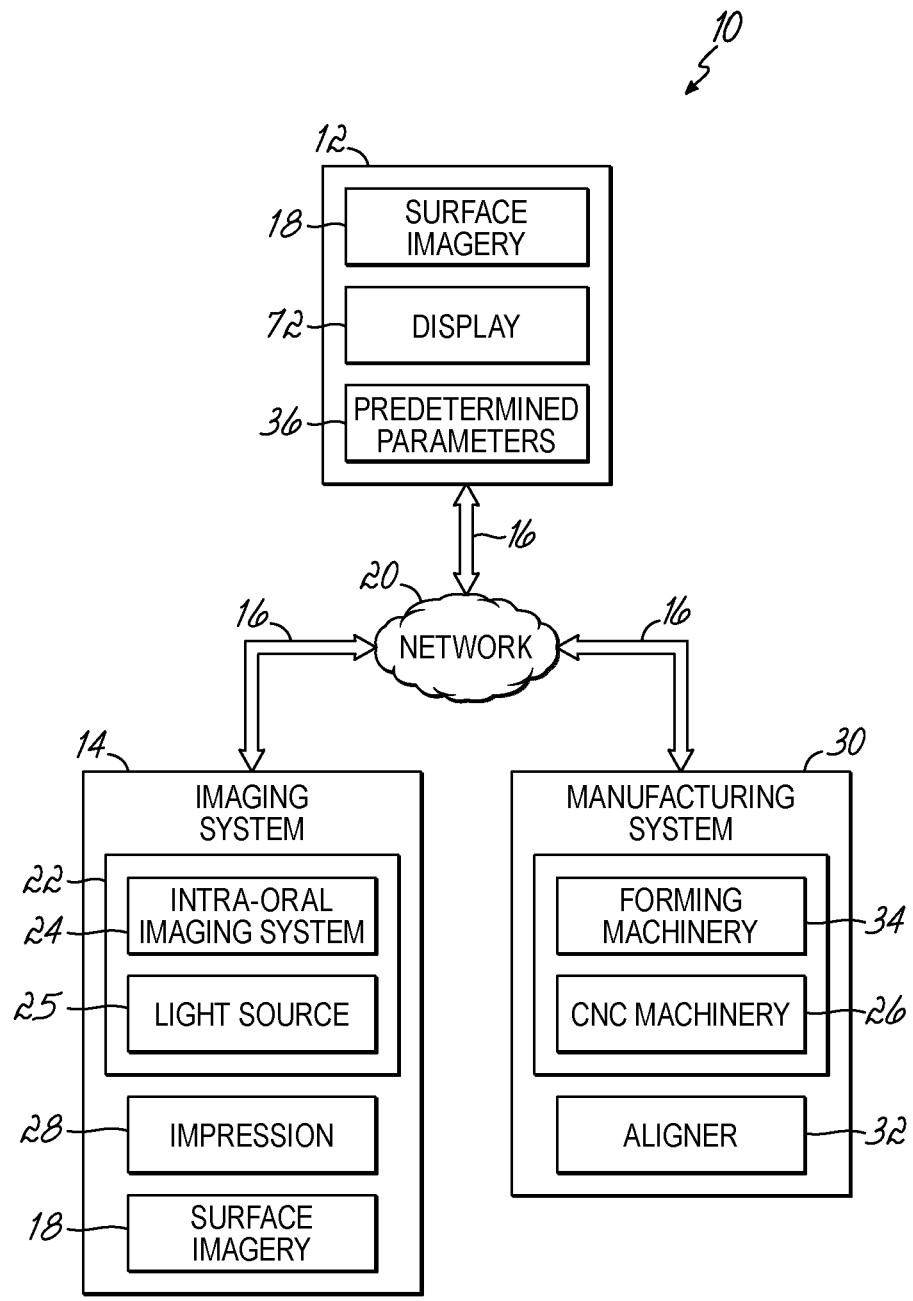
FIG. 1A is a schematic view of a system according to one embodiment of the invention.
Figure 2:
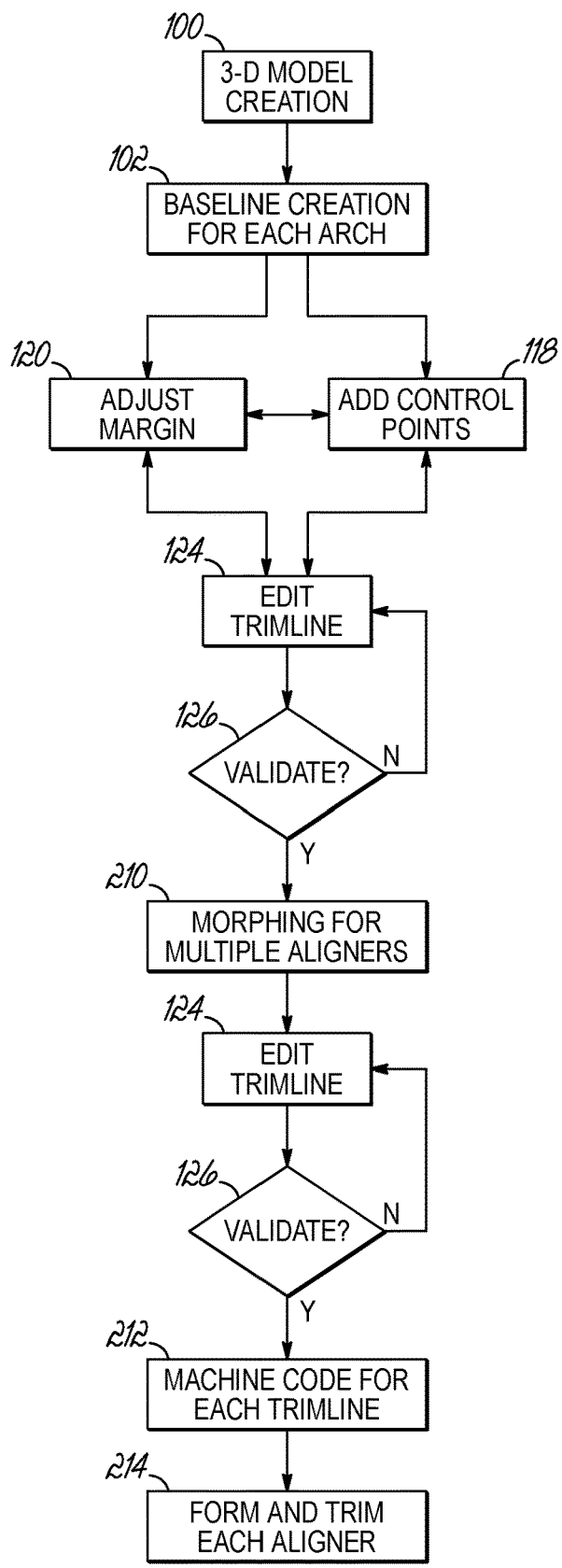
FIG. 2 is a flow chart of a process used in developing a trimline for an aligner.

With reference to FIGS. 1, 1A, and 2, in a computer implemented method, according to one embodiment, a clinician obtains or is provided with images of a patient's teeth, particularly the crowns of the patient's teeth, such as with an intraoral scanning device or PVS impression. The clinician may also obtain image information of the roots and crowns of the patient's teeth, such as volumetric data acquired from cone beam computed tomography (CBCT). The images may be in or importable into a 3-D virtual computer environment. With one or both forms of data, a 3-D digital model 70 of the patient's teeth is produced at 100. By way of example only, systems and methods of preparing 3-D models of a patient's teeth are known according to at least U.S. Pub. Nos. 2018/0165818 and 2014/0272772, which are assigned to Ormco Corporation and are incorporated by reference herein in their entireties.

In an exemplary embodiment and with reference to FIG. 1A, the system 10 includes a computer 12 and at least one imaging system 14. The computer 12 may receive multiple imageries from imaging system 14 and/or another imaging system. Imagery may include surface imagery 18 of one or more of the patient's teeth. The computer 12 may include any suitable computational device, such as a personal computer, a server computer, a mini computer, a mainframe computer, a blade computer, a tablet computer, a touch-screen computing device, a telephonic device, a cell phone, a mobile computational device, dental equipment having a processor, etc. In certain embodiments, the computer 12 may provide web services or cloud computing services. More than one computer may also be used for storing data and one or more predetermined parameters 36 or performing the operations performed by the computer 12 in accordance with the embodiments of the invention. In the embodiment shown, while not being limited to any particular network, the computer 12 is operatively coupled via one or more wired or wireless connections 16 to the imaging system 14 over a network 20. The network 20 may comprise a local area network, the Internet, an intranet, a storage area network, or any other suitable network.

With regard to an intra-oral imaging system, imaging system 14 may include a wand 22 having an imaging sensor 24 and a light source 25. The imaging sensor 24 may be an intra-oral camera that captures information regarding the oral cavity of the patient when exposed to light, for example from the light source 25. As is known, the practitioner may insert at least a portion of the wand 22 into the patient's mouth. Using the light source 25 and the imaging sensor 24, the practitioner may capture data of all or selected crowns of the patient's teeth. Alternatively, surface imagery 18 may be produced by scanning an impression 28 of the patient's teeth.

The system 10 may also include or be in electrical communication with a manufacturing system 30 capable of manufacturing the aligners 32. The manufacturing system 30 includes both forming machinery 34 and CNC machinery for machining 26 a trimline on each of the aligners 32.

With reference to FIG. 1, the 3-D digital model 70 of the patient's teeth is created from one or both types of surface imagery 18 in the computer 12. The 3-D digital model 70 is shown on an exemplary display 72 of the computer 12 and includes a plurality of crowns of the patient's teeth 74 as well as the corresponding roots on a maxillary jaw 84. And, the 3-D digital model 70 may also include a plurality of crowns of the patient's teeth 80 as well as the corresponding roots on a mandibular jaw 82. The teeth 74, 80 are shown projecting from a modeled gingiva 86, 90. The modeled gingiva 86, 90 may be computer generated (e.g., as a point cloud) and positioned on the teeth 74, 80 to conform with the image data available for producing the teeth 74, 80. Specifically, a point cloud is received from the image data of the patient's teeth, which is used to define triangular shapes across the gingival surface. As a result, the gingiva 86, 90 may be generated at locations consistent with the intraoral scan imagery. A three-dimensional model 70 including gingiva may be prepared for each stage in the orthodontic treatment plan by defining a control point for each triangular area on the gingival surface, and transferring this control point in space—along with the associated triangle—on movement paths that match the movement of the nearest tooth to the gingival area where the control point is defined.

In general, with the 3-D digital model 70 shown, the system 10 may create an initial digital trimline 92, 94 that may be edited prior to manufacturing of aligners for use on the mandibular jaw 82 and/or the maxillary jaw 84, respectively, at each stage of orthodontic treatment. Once in its final, edited configuration, the digital information on the trimline is then converted to machine code, such as to a tool path (described below with reference to FIGS. 14-18). The tool path may be used to produce an aligner (FIG. 18) with an edge to correlate with the digital trimline created with the 3-D digital model 70.

To that end, with reference to FIG. 1, the 3-D digital model 70 may represent an initial stage of treatment (i.e., stage zero), which often presents the most difficulties with valid trimline development. Referring to FIGS. 1 and 2, following creation of the 3-D digital model 70 at 100, the system 10 positions a plurality of margin points 104 proximate the gingival margin 96 for each of the teeth 74, 80 on a respective jaw 82, 84. As shown, the margin points 104 may be proximate a gingival zenith of each tooth. By proximate, the location of the margin point 104 may be at a gingival-occlusal height of the gingival margin 96 though it may be spaced labially or lingually apart from the gingival margin 96 by a predetermined distance. The system 10 may default to the gingival-most locations proximate a modeled gingival margin 96 for creation of the margin points 104. As is described below, the clinician may selectively or globally adjust the location of each margin point 104, and further may define additional margin points along the margin of the tooth to better control and define the cut line for that tooth.

Once the margin points 104 are established and with continued reference to FIGS. 1 and 2, the system 10 creates the initial digital trimline 92, 94 (i.e., a baseline) connecting the margin points 104 at 102. In the exemplary embodiment shown, each baseline is a straightest possible line connecting the margin points 104 around each of the entire arches 82 and 84. When all parameters have a value of zero, this may generate the straightest possible baseline. The system 10 may create a baseline for each stage of treatment where the system 10 computes the gingiva. The baseline may include two types of curves—teeth curves 98 associated with each tooth 74, 80 and connector curves 100 connecting the teeth curves 98. By way of example, each margin point 104 shown defines a location on a tooth curve 98 (labeled in FIGS. 3 and 4). Each tooth curve 98 includes transition points 128 and both lingual and labial portions of each tooth curve 98 are based on the line around the tooth (LAT) 132. That is, the shape and location of each of the labial and lingual tooth curves 98 for a specific tooth may be defined by the LAT 132. The LAT 132 is defined where the modeled tooth 74, 80 cooperates with the modeled gingiva 86, 90. The clinician may adjust the tooth curves 98 with margin points 104 or by adjustment of the margin points 104 gingivally or occlusally by a margin parameter. The connector curves 100 connect the adjacent tooth curves 98 in the interproximal region. The clinician may edit the shape of each of the teeth curves 98 and the connector curves 100 to control the shape of the trimline.

As noted above, in one embodiment, in FIG. 2 at 118, to aid in editing the trimline in the interproximal regions, the clinician may optionally add one or more control points 106 between each margin point 104. The control points 106 define a location on a connector curve 100 and allow the clinician to control the shape of the connector curve 100 between transition points 128 with the adjacent teeth curves 98 where necessary. The relative position of the margin points 104 and the control points 106 may facilitate any desired scalloping of the trimline. In that regard, control points 106 are optional so that either or both of the trimlines 92, 94 may not include a single control point 106. Control points 106 may be removed at locations where a curved trimline in an interproximal region is not desired. In that case, the trimline may result in a relatively straight cut edge (i.e., no scallop) on an aligner that may be positioned at, occlusally of, or gingivally of the gingival margin 96 depending on the margin parameter.

When inserted, each control point 106 divides the baseline into a plurality of splines 108 connecting the control points 106 to adjacent margin points 104. The splines 108 essentially permit the clinician to control the transition of the teeth curves to the connector curves and vice versa. Thus, the shape of the splines 108 may be edited to track the gingival margin 96 along the teeth 74, 80 and to provide a curved transition in the interproximal spaces between teeth 74, 80, as is described below. The clinician may optionally delete control points 106 if their presence causes a distortion in the trimlines 92, 94.

Figure 3:
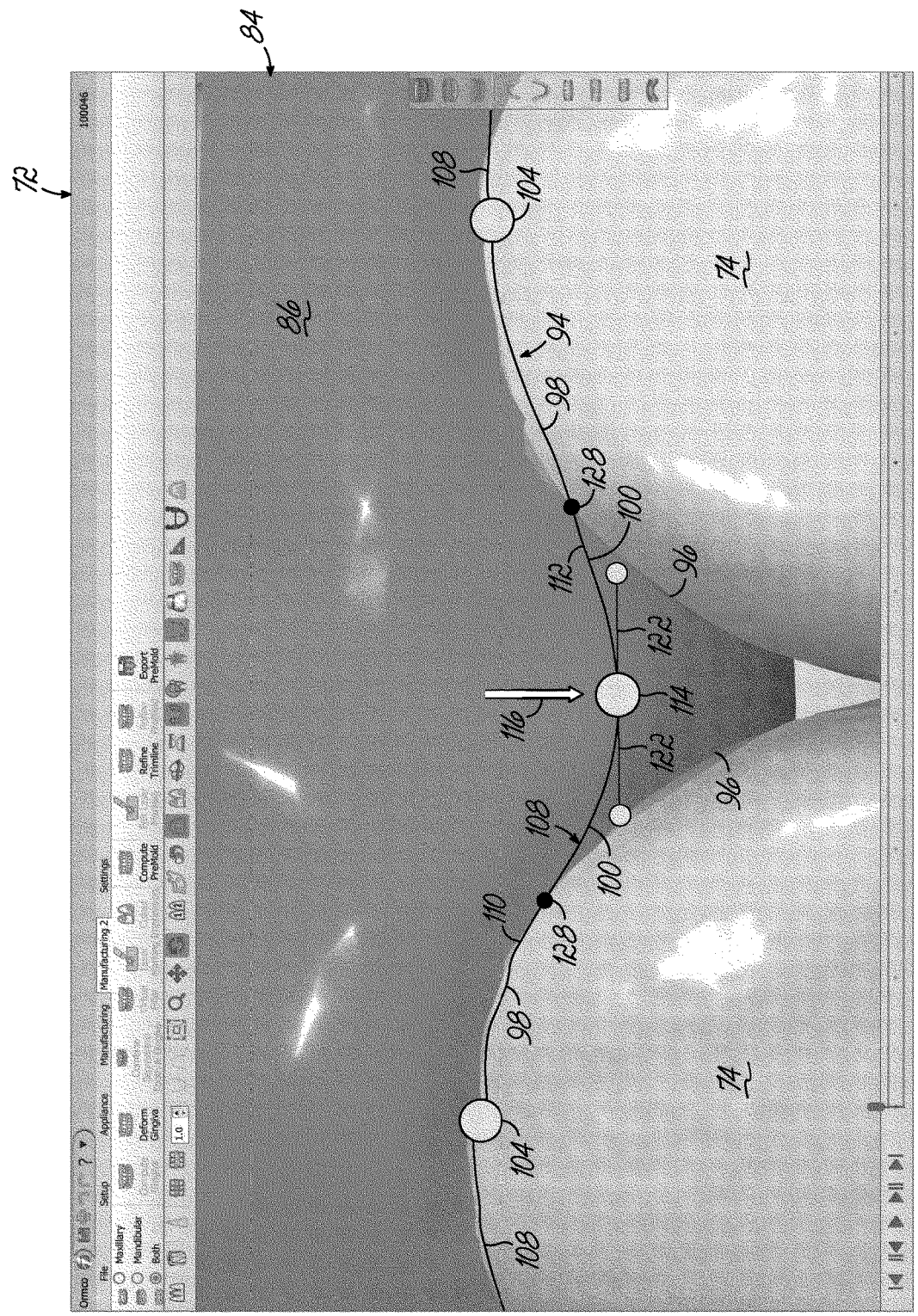
FIGS. 3, 4, 4A, 5, 6, 7, 8, 9, 10, 11, 12, and 13 depict alternative views of the 3-D tooth model of FIG. 1.

In the exemplary embodiment of FIG. 1, the splines 108 appear to collectively define digital trimlines 92 and 94 to be somewhat linear, however embodiments of the invention are not limited to any implied linearity. The splines 108 are defined by a polynomial in the three-dimensional space laying on the gingiva 90. Accordingly, they may be made to be complex curves through an editing process described below. For example, as is shown in FIG. 3, control point 114 divides the spline 108 between adjacent margin points 104 into two separately modifiable splines 110 and 112. While embodiments of the invention are described in which the control points 114 may appear to be midway between margin points 104, embodiments of the present invention are not limited to that location. The control point 114 permits collective and/or individual modification of splines 110 and 112.

According to one embodiment at 124 in FIG. 2, the clinician may edit the digital trimline 92, 94 from its baseline configuration by editing the teeth curves, connector curves, and the transitions points. For example, to edit the trimline 94 in FIG. 3, the clinician may move any single one of the margin points 104 or control points 106 and/or modify the splines 110 and 112. Editing the trimline 94 may include selectively moving one or more of the control points 106 relative to the margin points 104 as is generally indicated by comparison of the location of the control point 114 between FIGS. 1 and 3. For example, the clinician may select and then move control point 114 according to arrow 116 in FIG. 3 in an occlusal direction. Although not shown, the clinician may select and move the control point 114 in a gingival direction (i.e., opposite that shown according to arrow 116).

In the exemplary embodiment shown, movement according to arrow 116 may optionally initiate display of guides 122. In this way, the system 10 may provide a visual guide or ruler by which the clinician may visually assess the location of the control point 114 relative to the surrounding gingival margin 96 in the interproximal region. Advantageously, the system 10 provides guides for the clinician to use during editing to ensure that the trimline 94 is valid at all points between the adjacent margin points 104.

In the exemplary embodiment shown, the guides 122 are tangent to one or both of the splines 110, 112 at the control point 114. Further, as the control point 114 is moved according to arrow 116, the system 10 recalculates each of the splines 110 and 112 according to a parametric curve, such as a Bèzier curve. This may produce a smooth, continuous transition from the spline 110 to the spline 112 or vice versa and so produces smooth transitions from the tooth curves to the connector curves. As is shown in FIG. 3, the splines 110 and 112 may trace the gingival margin 96 along portions of the teeth 74 that are defined by the tooth curves, but deviate from the modeled gingival margin 96 in the interproximal space between the adjacent teeth 74 along the connector curves. Following editing, the trimline 94 may have a scalloped appearance with a series of alternating convex and concave curves defined by the splines 108, 110, and 112.

With reference to FIG. 2, at 120 and 124, prior to or after addition of the control points 106 to the digital trimline 92, the clinician may globally adjust margin points 104. By way of example only, with reference now to FIG. 5, this modification may be in an occlusal direction, that is, all of the margin points 104 that define the digital trimline 92 may be moved occlusally by the same amount. This may be referred to as a margin parameter and indicated by the distance D. This is shown generally by arrows 150 in FIG. 5. The digital trimline 92 may be moved occlusally by D relative to the location of the initial digital trimline 92 (i.e., the baseline) shown in FIG. 1, which is shown at a gingival-most margin location. Although not shown, the digital trimline 92 may be moved in the opposite direction shown in FIG. 5. Thus, the trimline 92 may be moved gingivally by a distance, similar to distance D. If so, the trimline 92 may lie on or adjacent the gingival margin 96 at many, if not all, locations. Further, the trimlines 92 and 94 may be adjusted before or after addition of the control points 106.

Figure 4:
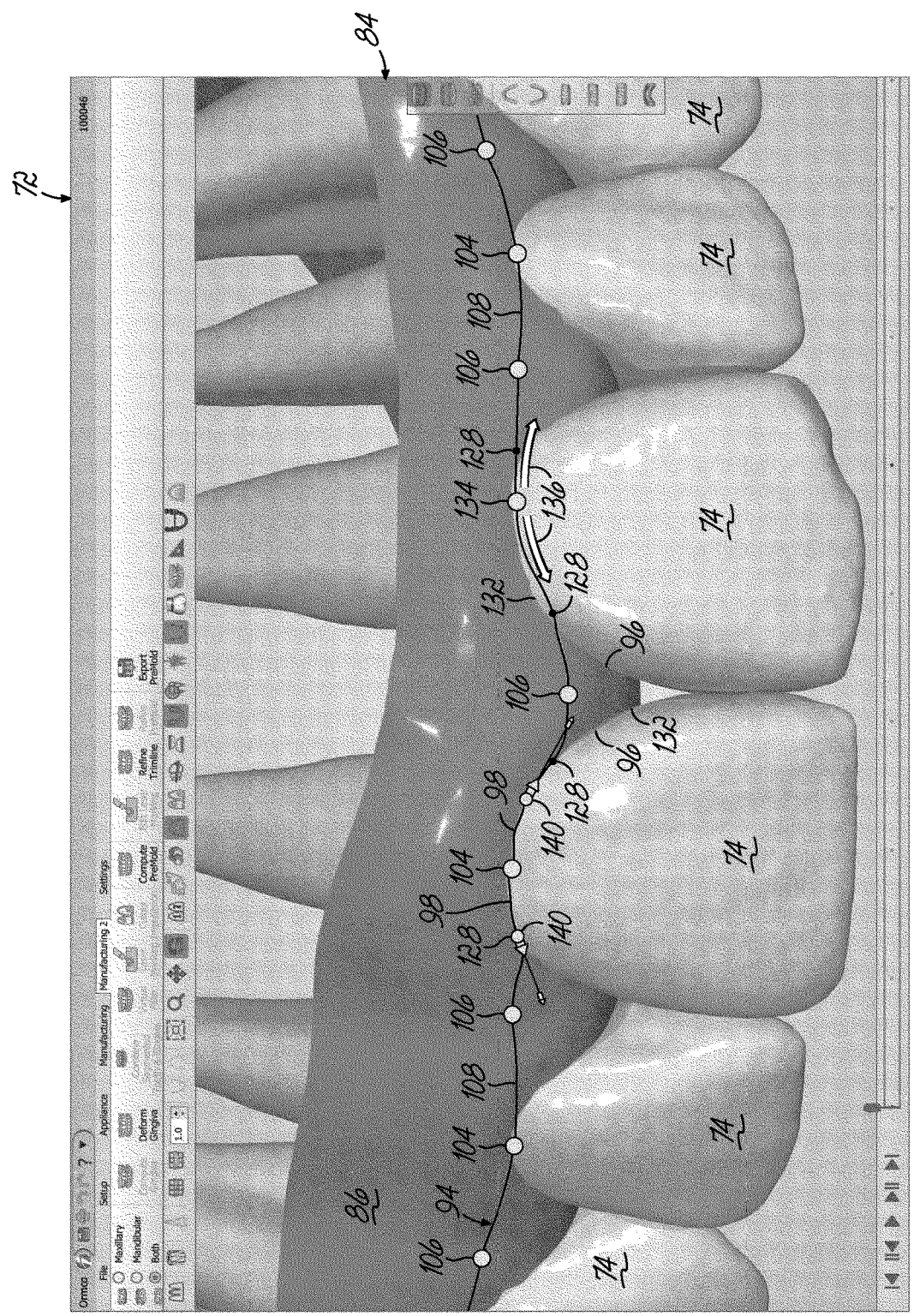
Figure 4A:
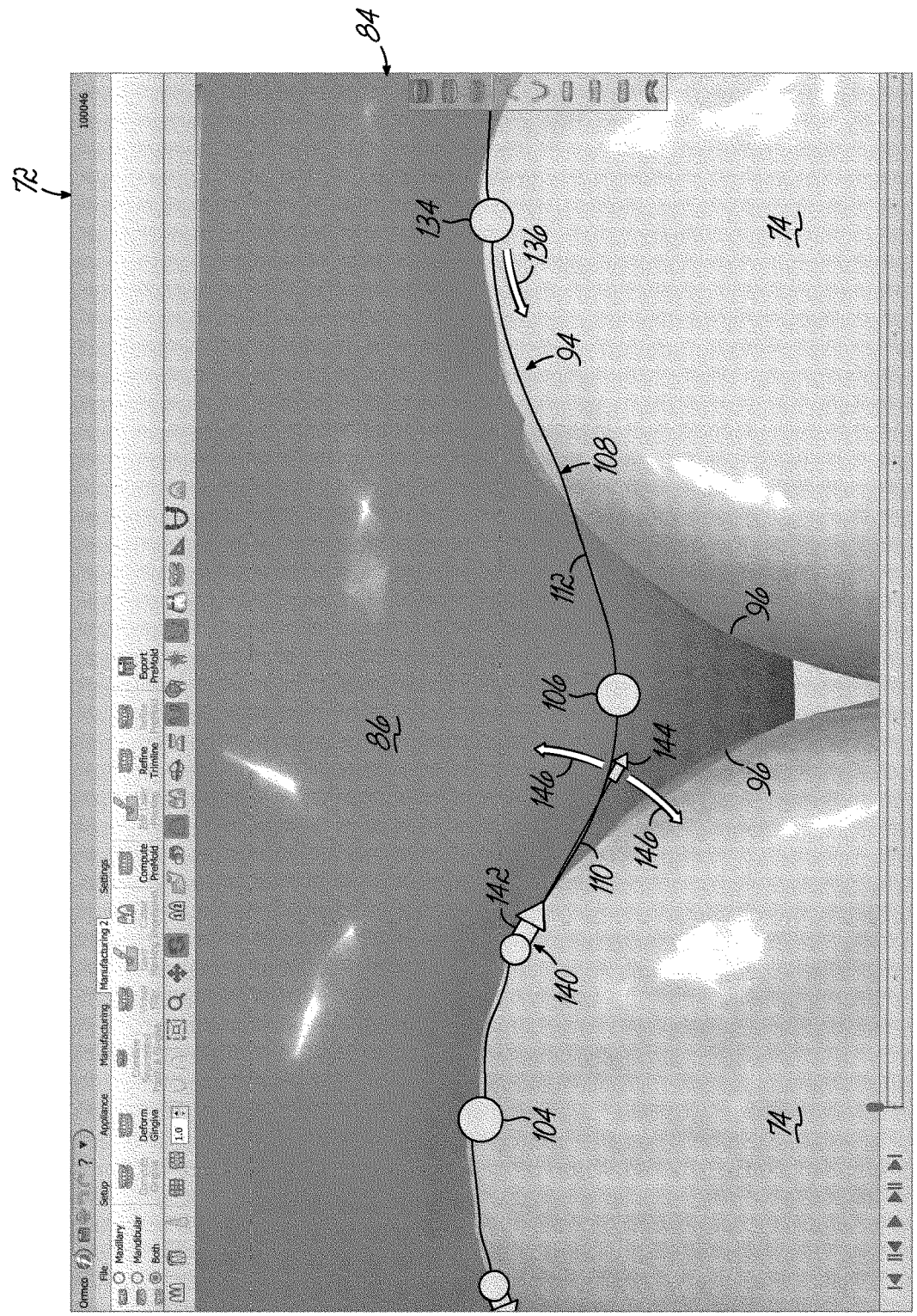

Further, the clinician may opt to move individual ones of the margin points 104, as is shown in FIGS. 4 and 4A, in addition to or in place of moving all margin points by a set distance. For example, in FIGS. 4 and 4A, during editing, the margin point 134 may be moved according to arrows 136 in relation to the gingival margin 96. In addition, the curvature of the trimline 94 between any margin point 104 and control point 106 may be adjusted by repositioning one or more vectors 140. As shown, the vectors 140 may be displayed as a base point 142 and directional indicator 144. The base point 142 may coincide with the transition points 128. In this way, the clinician may utilize the vectors 140 to modify the location and magnitude of a change in curvature of the individual splines 110, 112 without further moving the margin point 104 or control point 106. For example, the curvature of the spline 110 may be modified at a location of the base point 142 by changing the magnitude of the directional indicator 144 and its orientation by rotation about the base point 142 according to arrows 146 in FIG. 4A.

Figure 6:
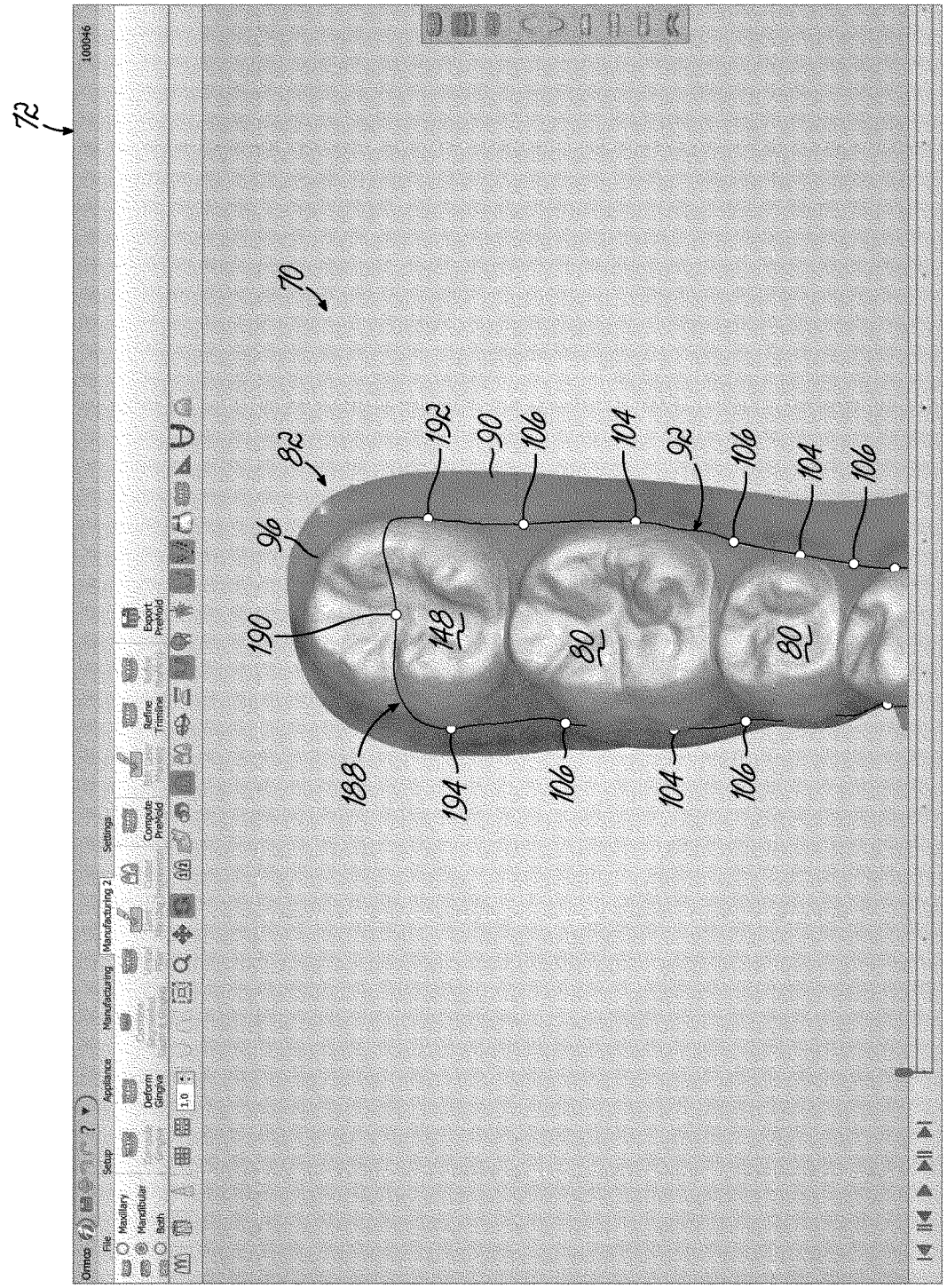
Figure 7:
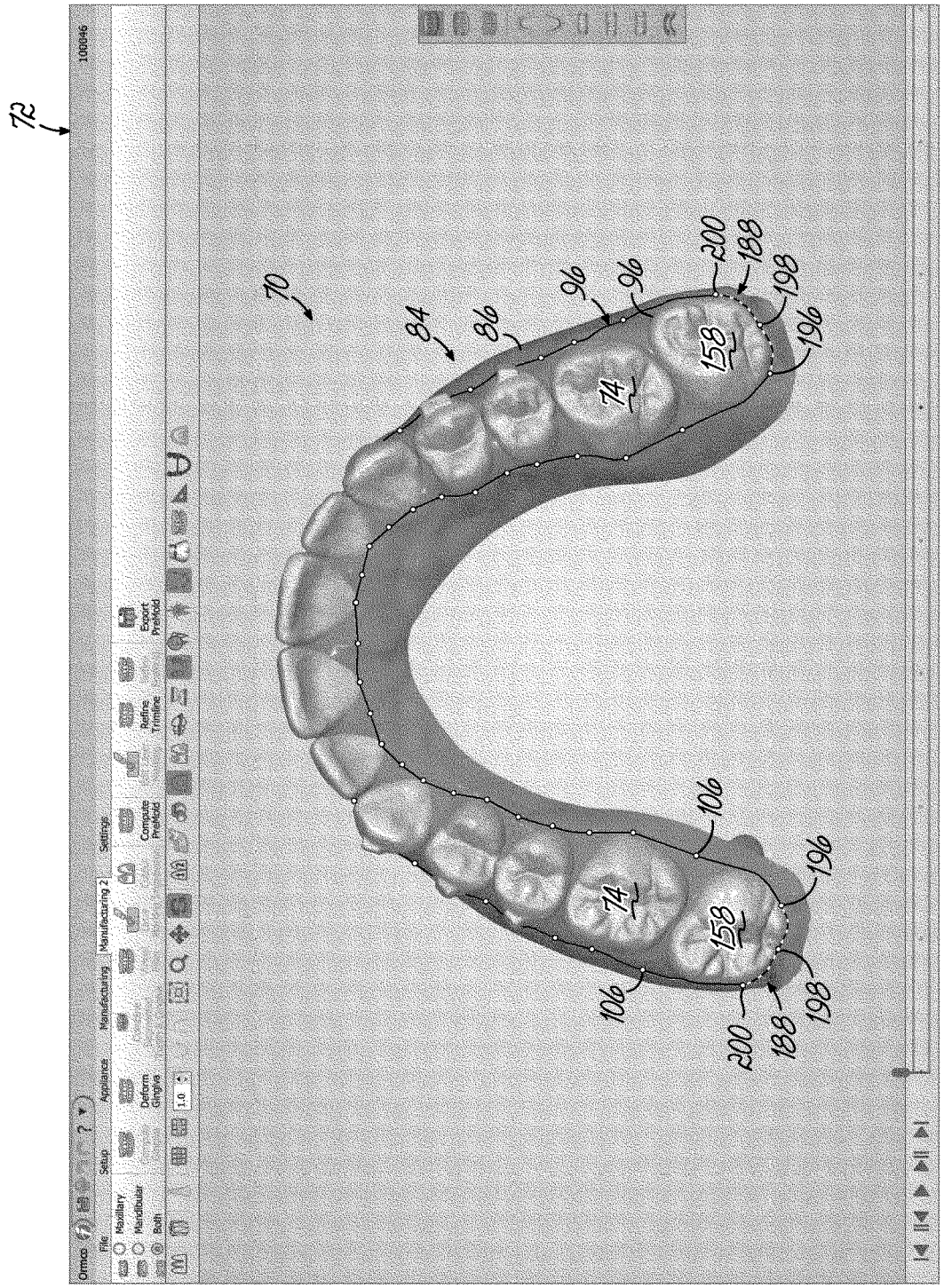

With reference to FIGS. 6 and 7, each digital trimline 92, 94 transitions from its labial location along the respective teeth 74, 80 to its lingual location along the teeth 74, 80 at a molar 148 and 158, respectively. These transitions are generally shown at 188. During any one of steps 102, 118, 120, and 124 in FIG. 2, the clinician can determine whether to edit the transition 188 by orienting the digital trimline 92, 94 around or over the respective molar 148, 158. For example, the digital trimline 92 may follow the tooth curve around the tooth. Alternatively, in FIG. 6, the clinician may add a control point 190 on an occlusal surface of molar 148. Thus, the digital trimline 92 transitions from a control point 192 to the control point 190 on the occlusal surface of the molar 148 to another control point 194 proximate the gingival margin 96 on the opposing side of the molar 148 from the original control point 192. This pathway for the digital trimline 92 in the transition 188 may be the clinician's decision or may be automatic depending on, for example, if the molar 148 is not fully erupted. In that regard, the system 10 may measure the location of the incisal surface of the molar 148 relative to an adjacent molar to determine whether to extend the pathway over or around the molar 148. Alternatively, the system 10 may automatically generate the trimline over or around the molar depending on the location at which the clinician adds a control point, such as control point 190 which would cause the system 10 to extend the trimline 92 over the molar 148.

Rather than go over the molar 148 as is shown in FIG. 6, in one embodiment, the clinician may opt to extend the trimline 94 around the molar 158 proximate the gingival margin 96. This is shown by way of example in FIG. 7. At the transition 188, control points 196, 198, and 200 along the trimline 94 cause it to loop around the molar 158 at a location that generally follows the gingival margin 96. In this case, an aligner made according to the trimline 94 would encapsulate the molar 158 during treatment.

During steps 102, 118, 120, and 124, the clinician may create and edit either one or both of the digital trimline 92 on the lower jaw 82 and the digital trimline 94 on the upper jaw 84 of the 3-D digital model 70.

Referring to FIG. 2, in one embodiment, the system 10 evaluates each edit of the digital trimline 92, 94 against the predetermined parameters to determine if the edits produce problems with the manufacturing of the aligner 32 or with aligner performance. This is referred to as validation. In the exemplary embodiment shown in FIG. 2, after any single one of the steps 118, 120, and/or 124, the system 10 validates the edited trimline 92, 94 at 126. During validation, which may occur continuously in response to each edit of the digital trimline 92, 94, the system 10 evaluates the digital trimline 92, 94 at all locations against a set of predetermined parameters.

By way of example only, and not limitation, the set of predetermined parameters include one or more requirements including that the trimline is a closed curve (i.e., it is a continuous line around the teeth), that the trimline extends tooth-to-tooth (with some exception for teeth that are crowded together) on the tooth and/or gingival surfaces. By way of further example only, and not limitation, other requirements may include that the trimline does not produce a radius that is less that a predetermined value. As an example, a clinical radius of the trimline must be greater than a predetermined minimum value. And, in the interproximal regions, the trimline must produce a radius greater than a minimum value. This curvature is typically concave so that the radius of that curvature must be at least as large as the tool radius so that the tool may physically produce the targeted radius. The orientation of the tool rotational axis at all locations along the trimline should be close to the surface normal at that location. The location of the trimline relative to any attachments or devices must maintain structural integrity of the aligner, and at each interproximal tooth location, the labial-lingual distance between the trimline on the labial surface and the trimline on the lingual surface is defined by the clinician. This facilitates a sufficient structural strength and thus avoids breakage of the aligner during use or day-to-day handling.

Figure 8:
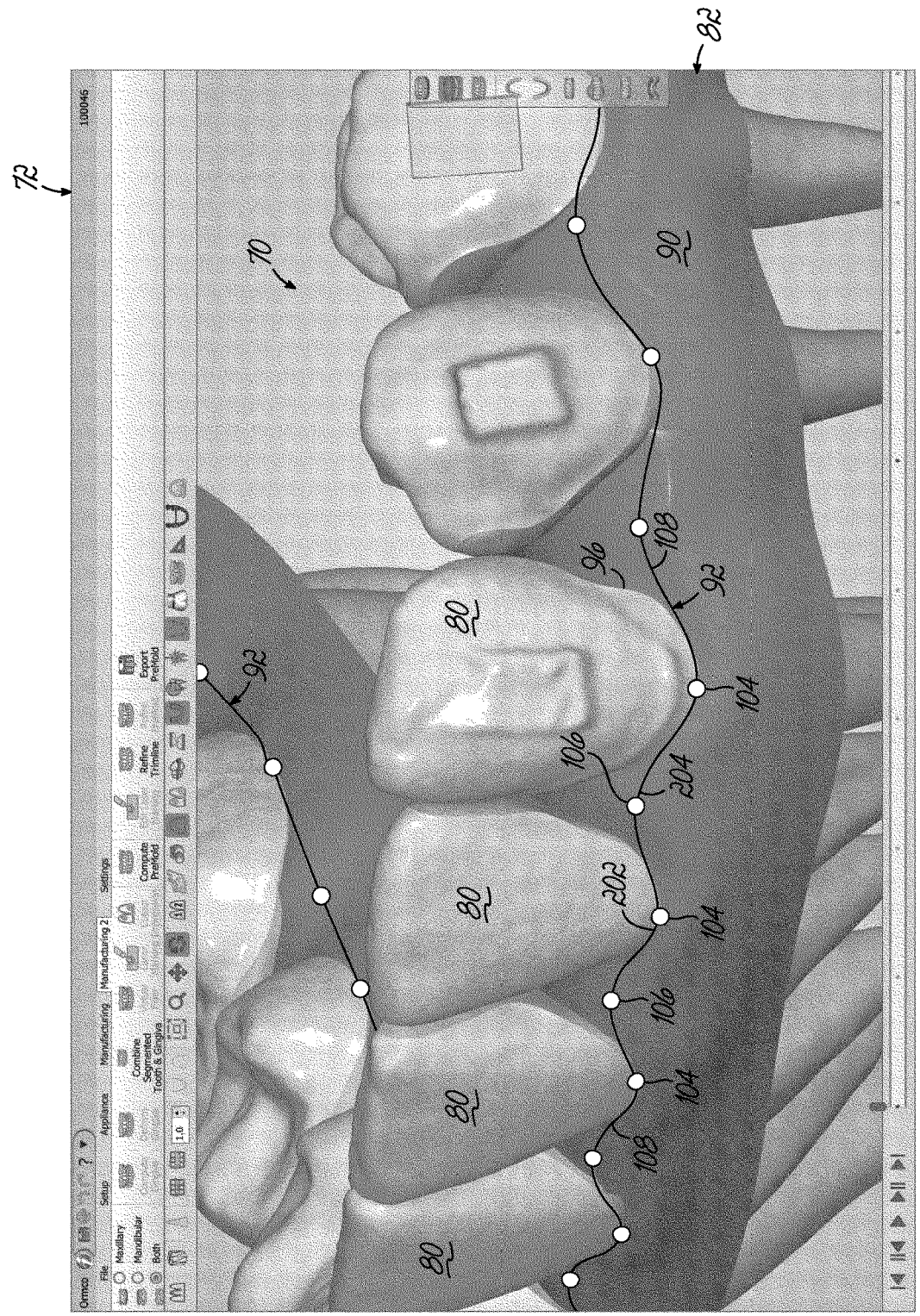

With reference to FIG. 8, an exemplary trimline 92 is shown which satisfies the predetermined parameters. For example, although not shown, the digital trimline 92 is continuous, extends tooth-to-tooth with an alternating concave-convex curve, a radius of curvature at each tooth indicated, for example at 202, produces a scallop of sufficient curvature that is not too sharp, and a radius of curvature at each interproximal location, for example at 204, produces a curvature that is machinable with a selected tool while also not greatly inhibiting the strength of the aligner at that location.

Referring again to FIG. 2, during validation of the trimline at 126, if the system 10 determines that one or more of the predetermined parameters is violated, the system 10 visually indicates that the trimline 94 violates the parameter by, for example, changing the color of the trimline 94. Although color is not shown in the figures, the system 10 may change the line color from green, indicating a valid trimline to another color. For example, if the clinician's edit causes a validation problem, the system 10 alters the color of the trimline or the specific portion that fails validation from green to yellow, from green to orange, or from green to red. The color change may depend upon the severity of the validation issue, with red indicating that that portion of the trimline requires the clinician's further attention. Examples of trimlines that fail validation are shown with reference to FIGS. 5, 9, 10, 11, 12, and 13.

Figure 5:
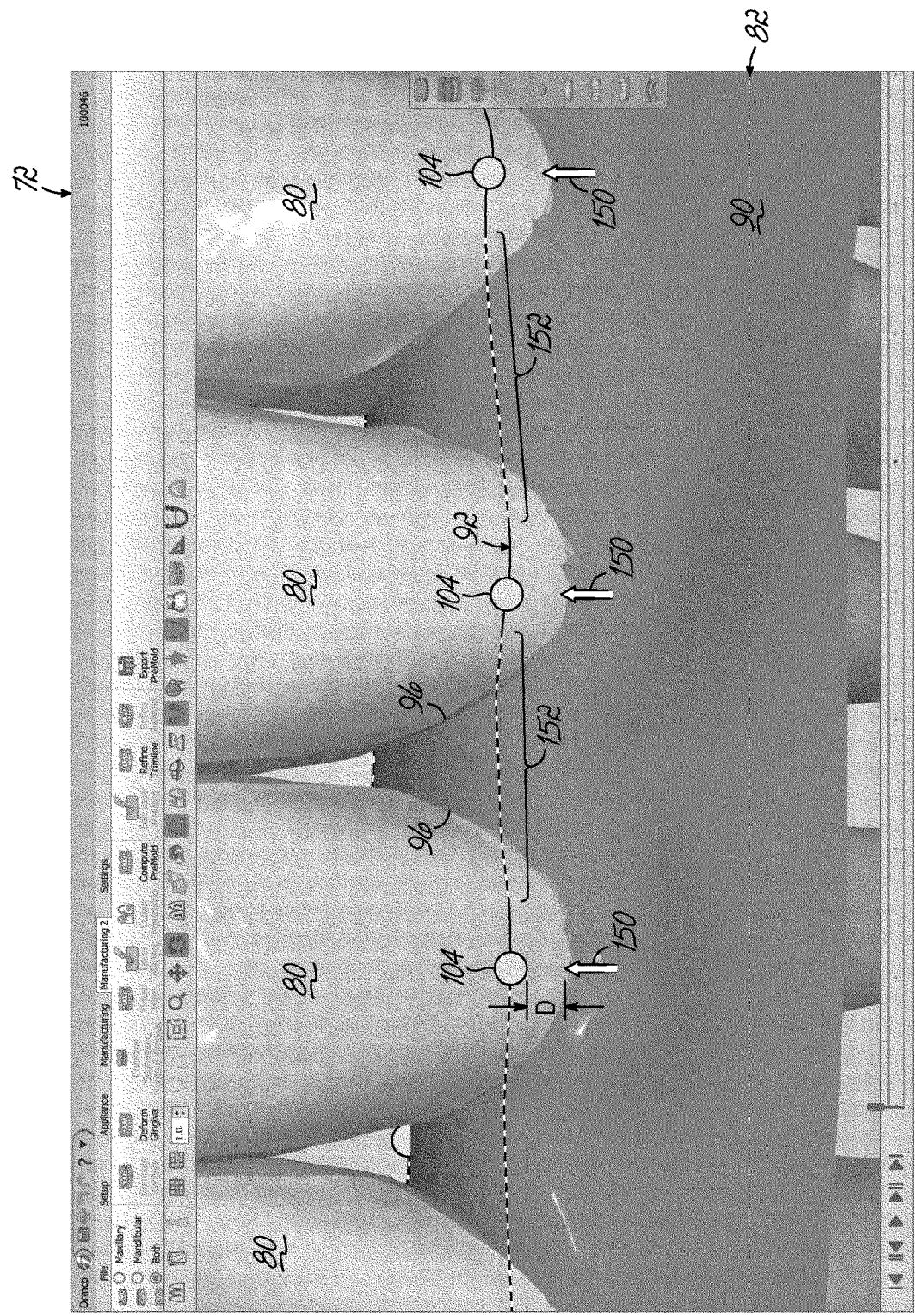
Figure 9:
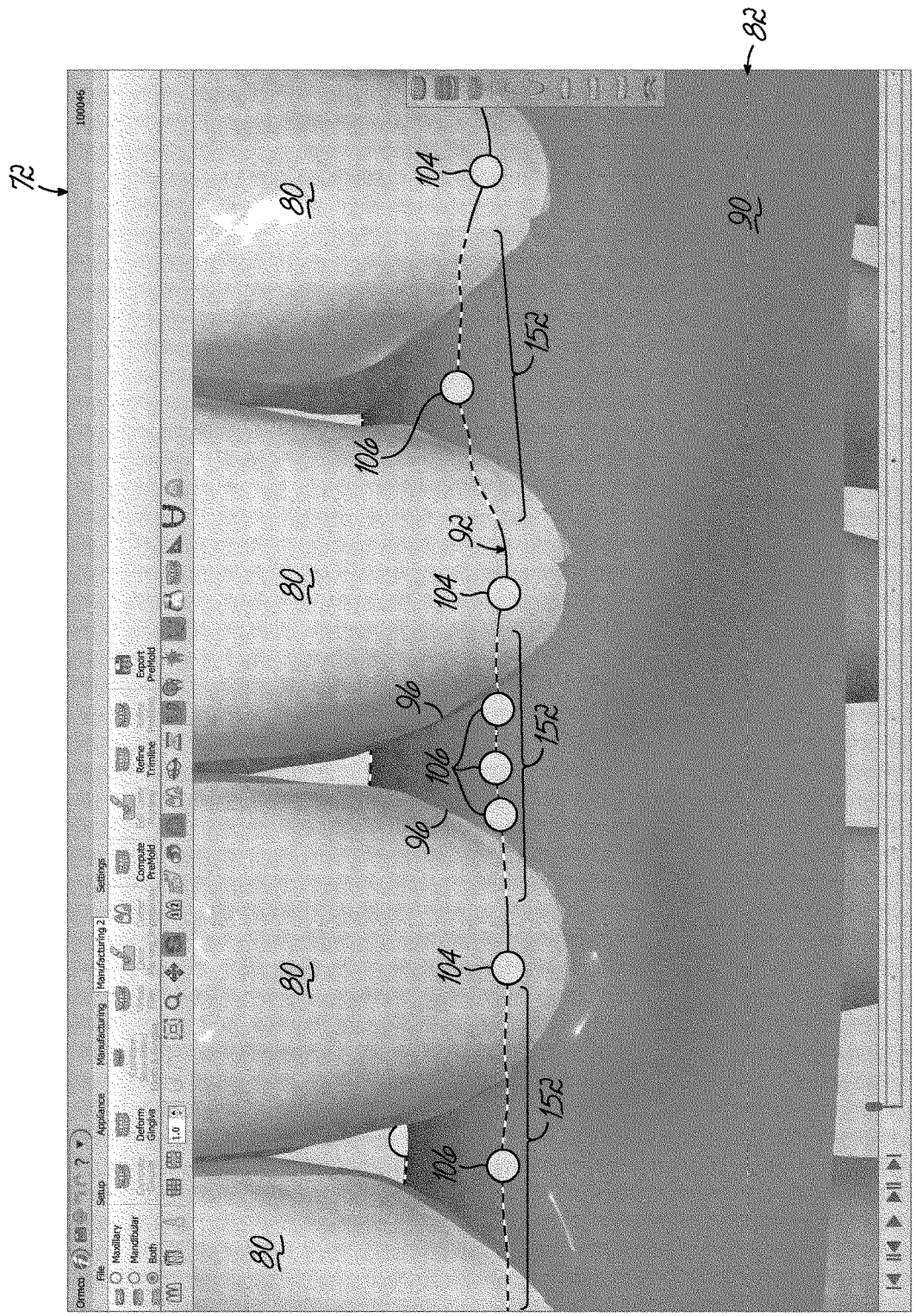

During editing and with reference to FIG. 5, the clinician may adjust the margin amount along the tooth-gingival boundary for each tooth 80 along the mandibular jaw 82, for example. This may be a global modification of the trimline along all teeth in the jaw 82 or selective modification of individual margin points 104 of the teeth 80 in the jaw 82. In FIG. 5, the portions of the digital trimline 92 that fail validation are indicated at 152. For example, the clinician's movement of the digital trimline 92 occlusally to increase the distance of the digital trimline 92 from a gingival zenith by distance D may produce an aligner that is too narrow at the interproximal regions. In this case, an aligner produced with the digital trimline 92 may be prone to breakage during use or have insufficient strength to produce the desired tooth movement. The system 10 indicates that the trimline edit is at least questionable by turning the digital trimline 92 from green to yellow in each of the locations 152. The clinician may then further consider that particular edit. A similar failure is shown in FIG. 9, in which the system 10 changes the color of the trimline 92 at locations 152 to notify the clinician of a likely problem with the aligner in these areas.

Figure 10:
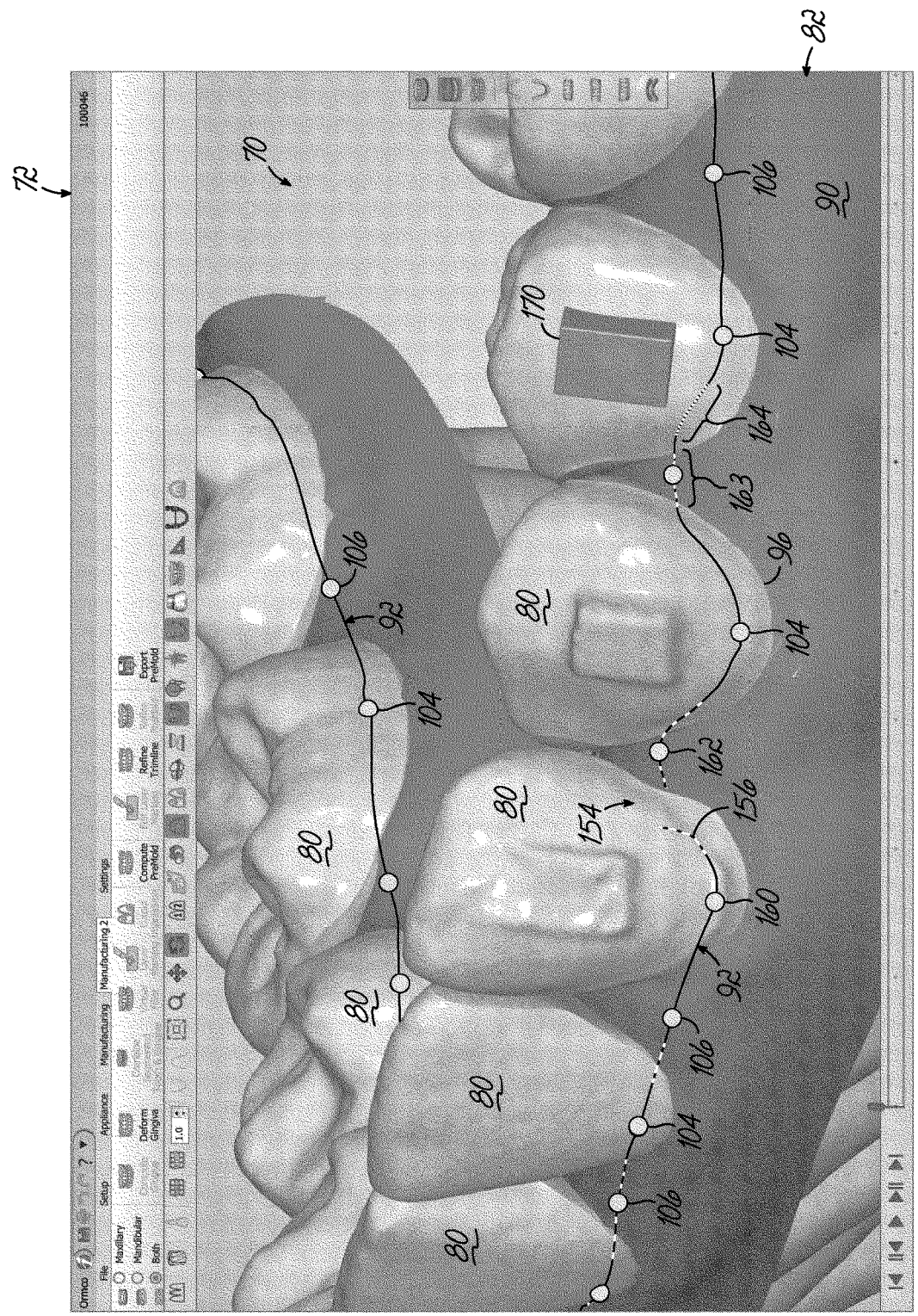

By way of further example only, and with reference to FIG. 10, an edit at 154 produces a break in the spline 156 between the margin point 160 and the control point 162. Because the break at 154 produces an open curve, the digital trimline 92 fails validation. The system 10 may change the color of this portion of the trimline 92 to red. Also shown in FIG. 10, at locations 163 and 164, the system 10 indicates that the digital trimline 92 fails validation. At location 163, the system 10 may indicate that the labial-lingual dimension of the aligner at this location is too thin. This is best shown with reference to FIG. 11. The system 10 indicates that a lingual-most to labial-most distance at each of the interproximal regions 166 and 168 causes the digital trimline 92 to fail validation at 126 in FIG. 2. Depending on the distance, the color of the trimline 92 at 163 may be yellow, orange, or red.

Referring again to FIG. 10, at location 164, the system 10 changes the color of the trimline 92 to notify the clinician that the digital trimline 92 is too close to an attachment 170. This relative location may produce difficulty in machining and/or weakness in the aligner. The clinician, having been notified of the problem, may then modify the digital trimline 92 to address each failure in validation in real time.

Figure 12:
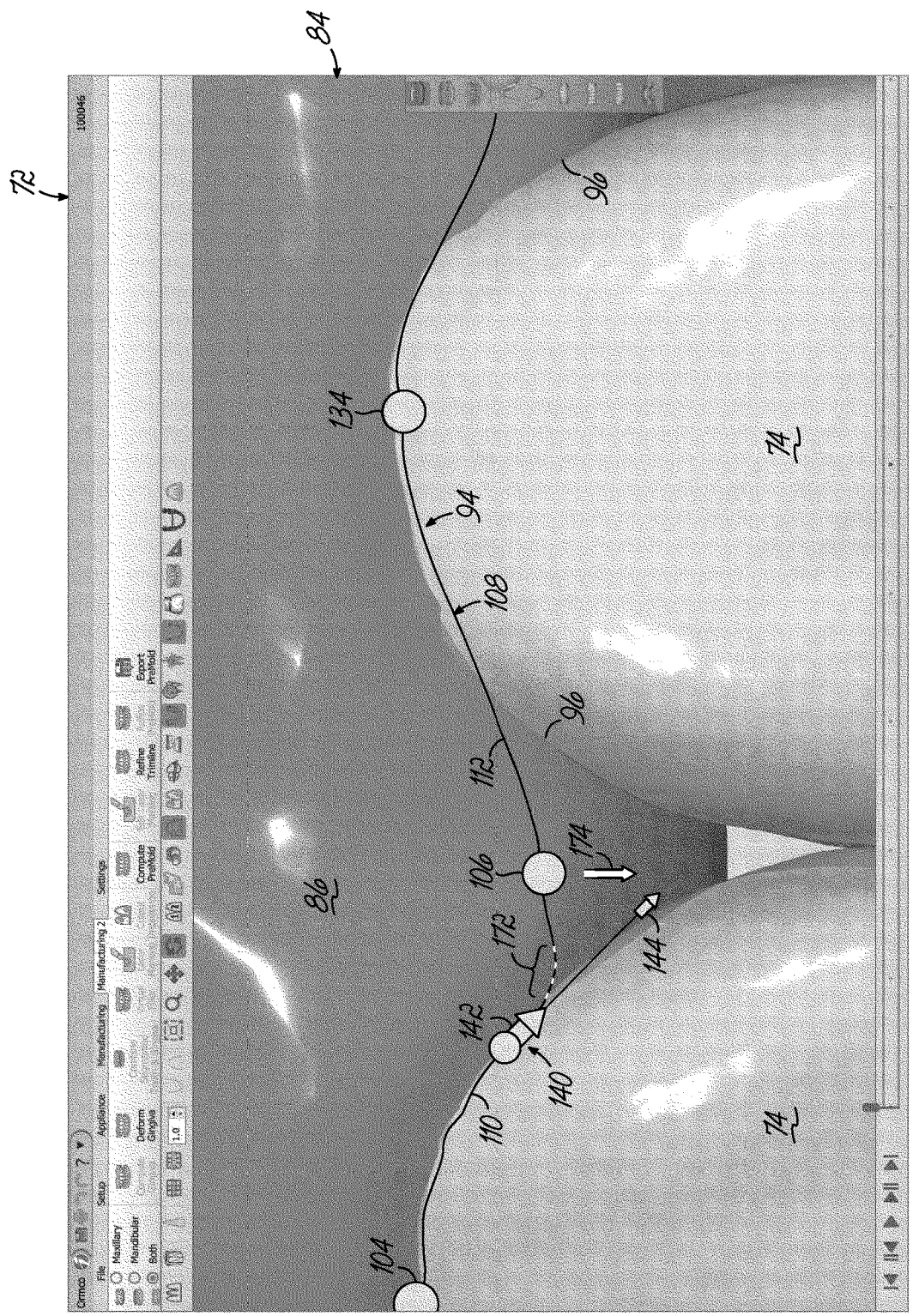
Figure 13:
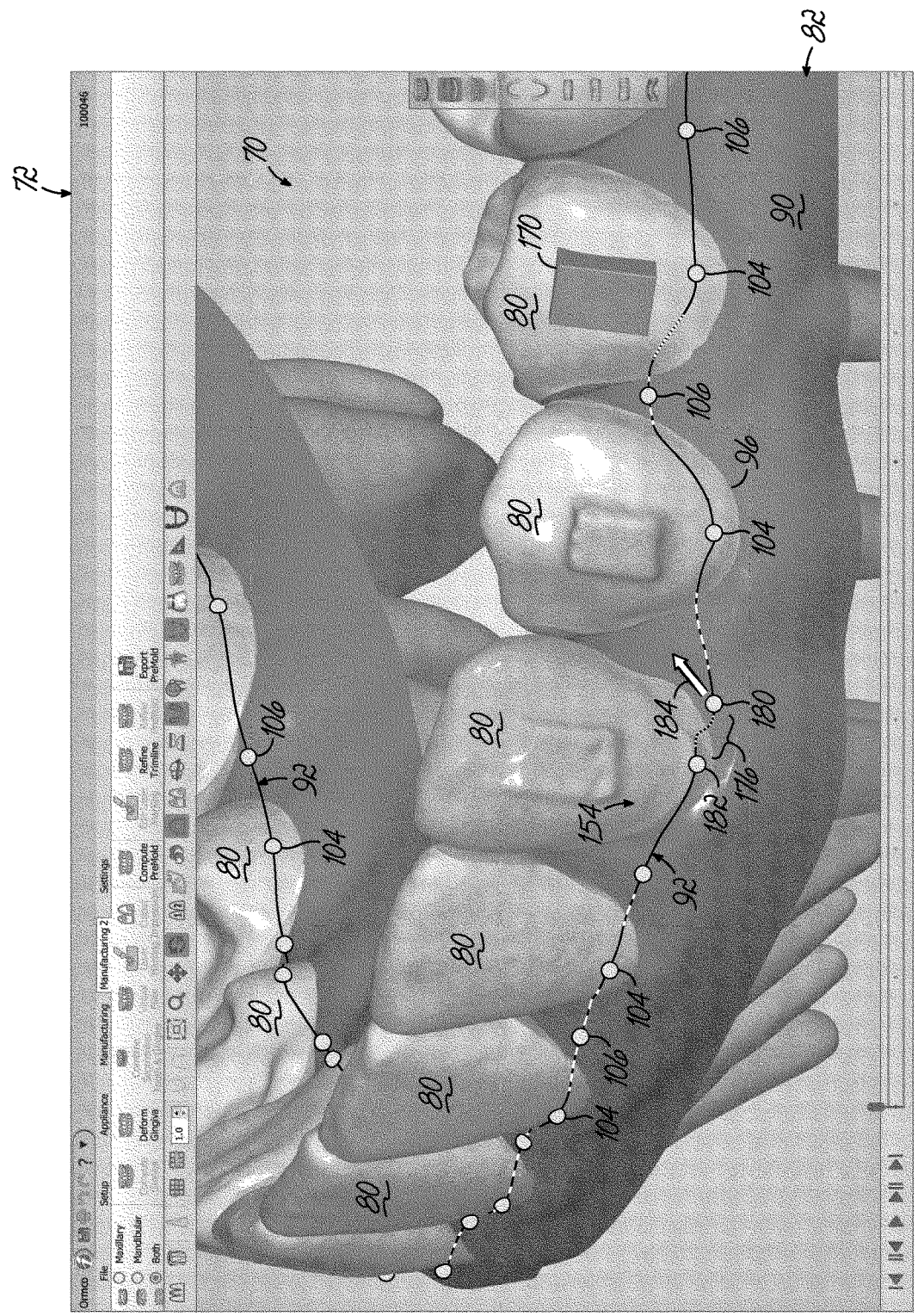

Another example of an edit that causes the trimline to fail validation is shown in FIG. 12. At 172, the digital trimline 92 fails validation. The radius of curvature produced by the vector 140 may be too great so as to cause a validation failure. This radius may be less than the minimum tool radius or less than the minimum clinical radius. In this situation, the clinician may move the control point 106 in the direction of arrow 174 or adjust the vector 140 to increase the radius of the spline 110 in the location of 172. A similar failure exists in the digital trimline 92 shown in FIG. 13. At location 176, the system 10 changes the line color to red to indicate that the concave-convex distortion fails validation. The clinician may address that failure by moving control point 180 relative to the margin point 182 in the direction of the arrow 184.

Figure 11:
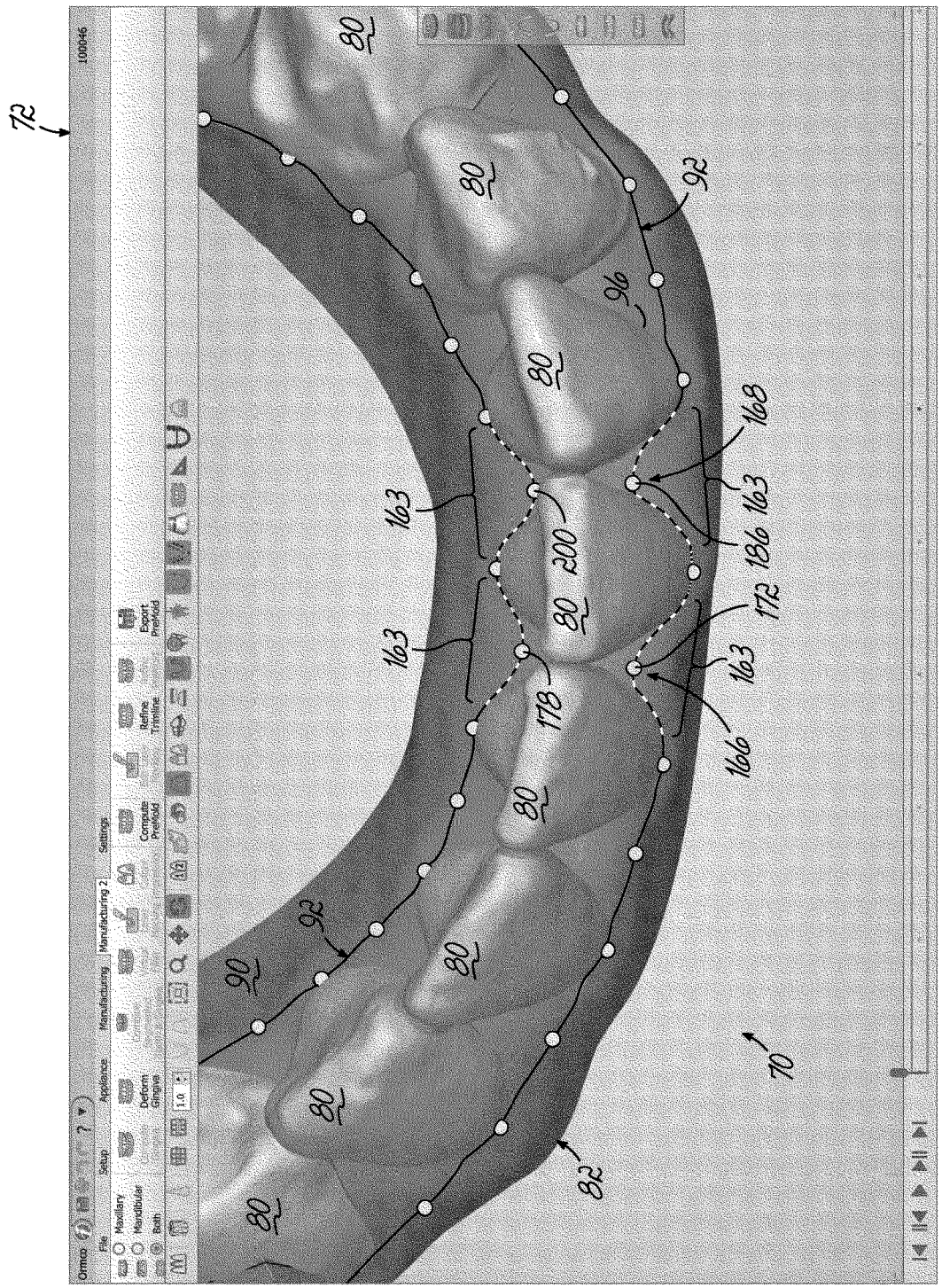

In one embodiment, the system 10 permits replication of portions of the trimline to other locations along the trimline during editing at 124 in FIG. 2. Once the clinician has edited the trimlines 92, 94 at any single tooth so that the trimline 92, 94 is valid for that tooth, that particular geometry may be replicated to other teeth. For example, and with reference to FIG. 11, once a desirable scallop is created for a labial surface of an anterior tooth, that scallop may be replicated to the trimline along the lingual surface of that anterior tooth. In FIG. 11, a desirable scallop created in the interproximal region 166 at the control point 172 may be mirrored to a lingual location 163 to automatically position the control point 178. In addition, the desirable scallop at the control point 172 may be replicated contralaterally to a labial surface of a related anterior tooth to automatically produce the control point 186 and then mirrored to locate control point 200. More specifically, for example, the geometry and location of a labial portion of a trimline for an anterior 11 may be automatically replicated to a lingual portion of the trimline for the anterior 11 and be contralaterally replicated to both the labial and lingual portions of the trimline at the anterior 21. Advantageously, replication of features from one location on the trimline to another location saves the clinician significant time during editing.

In one embodiment, and with reference to FIG. 2, once each digital trimline 92 and 94 passes validation, additional trimlines may be created and edited for each position of the patient's teeth as determined by the treatment plan. This is indicated at 210 in FIG. 2. This may entail editing additional three-dimensional models of teeth for each of those positions established by the treatment plan. Alternatively, the trimline created for the 3-D digital model 70 at T0, for example, may be morphed throughout each additional three-dimensional model in the treatment plan. In this way, creating and manually or automatically editing a single trimline may facilitate creation of trimlines for the patient's jaw through all subsequent three-dimensional models.

Morphing may take into account changes in the teeth positions at each stage of treatment. The system 10 may automatically adjust the initial, validated trimline to the teeth movement according to the treatment plan. To do so, the system 10 may slide the margin points and control points with the teeth and/or gingiva in response to the desired tooth movement. This may be achieved, for example, in models where the teeth and/or gingiva are defined as point clouds, such as from an original intra-oral scan. Triangles are formed by connecting the points in the point cloud. Each margin point and control point is placed in a selected triangle and the points slide to each new position using the transformations of gingiva defined by the treatment plan. The system 10 may allow the clinician to manually slide margin and control points. Manual sliding may be advantageous in situations where tooth movement causes the location of the trimline following sliding to fail validation or otherwise creates a poorly oriented trimline. The system 10 may automatically morph the automatic and/or manual sliding to the trimlines for all subsequent stages of treatment. The clinician may optionally select to not propagate manual sliding.

In addition to replication and morphing features, the system 10 includes tools that allow the clinician to selectively group various stages of orthodontic treatment and utilize the trimline features for each aligner in that preselected group. For example, if the patient requires 30 aligners for treatment, the clinician may selectively morph the digital trimline 92 and/or 94 for aligners at stage 0 to aligners for stages number 1 through number 10. Similarly, the clinician may morph the trimlines for aligners at stage 11 through stage 20, and the clinician may morph trimlines for aligners at stage 21 through aligners for stage 30. With the availability of these tools, the system 10 advantageously reduces the time required to produce a trimline for each aligner at each stage of treatment.

As is shown in FIG. 2, following morphing of an edited trimline that passes validation, those trimlines that are created from morphing may each be edited and validated in accordance with editing and validation described above. Thus, each trimline for each aligner is subject to validation and further editing where necessary or desirable.

Figure 14:
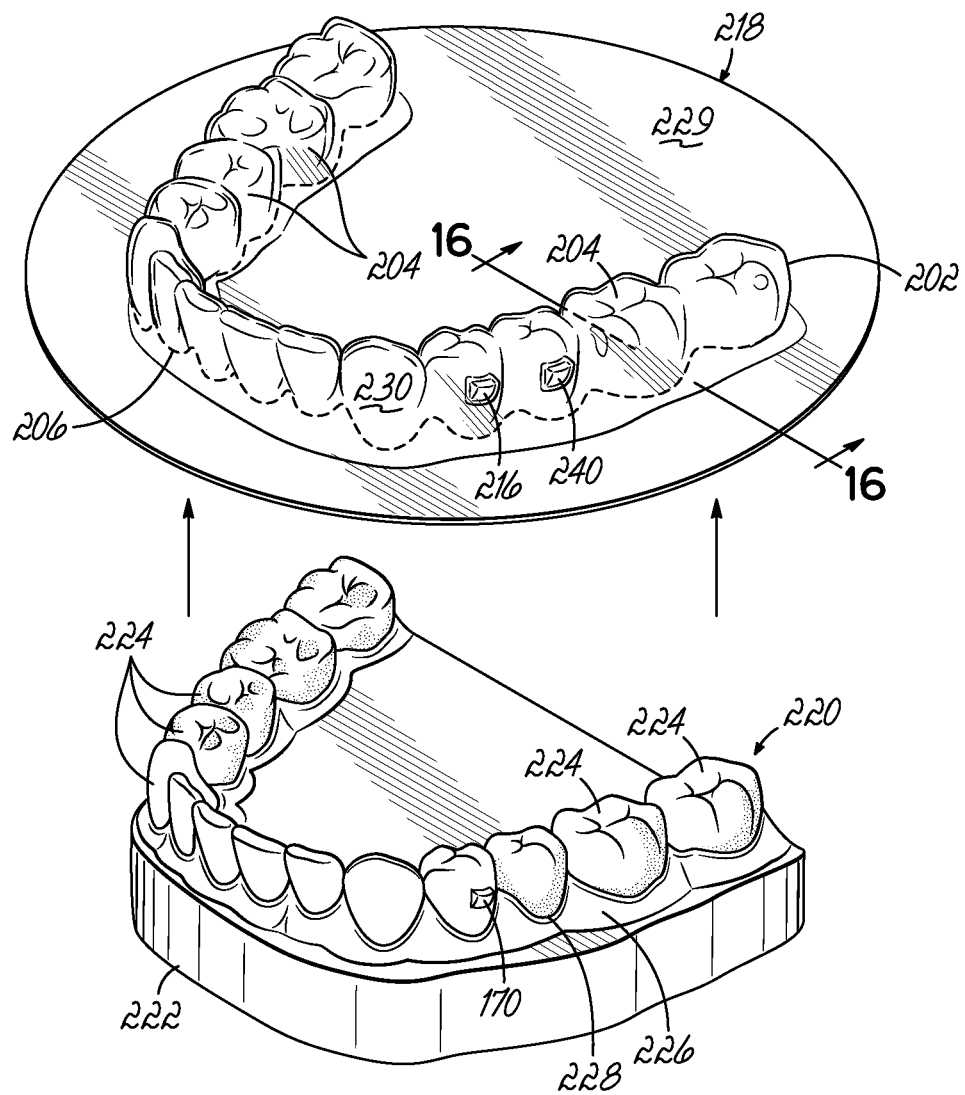
FIG. 14 is a perspective view of a mold and a workpiece following forming in one embodiment of manufacturing an aligner.
Figure 15:
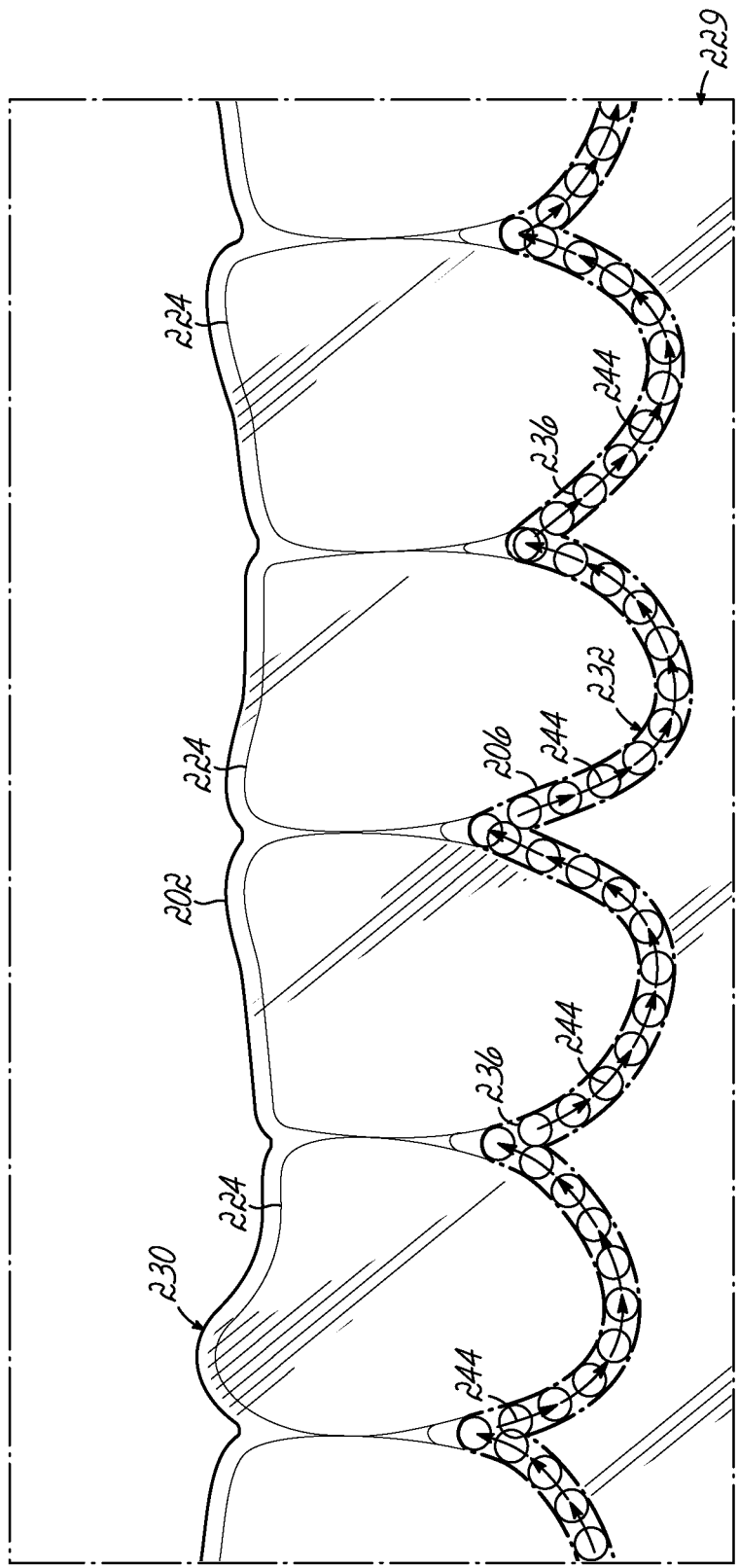
FIG. 15 is a schematic view of a tool path to define an edge of an aligner during trimming according to one embodiment of the invention.

Following creation, editing, and validation, the digital trimline 92, 94 is applied in the manufacturing of one or more aligners. To that end, in FIG. 2 at 212, the digital trimline 92, 94 is translated to machine code for use with the CNC machinery 26 or robot for a trimming process that cuts the aligner 32 (shown in FIGS. 1A and 18) from a workpiece. With reference to FIGS. 14 and 15, an exemplary process of forming the aligner 32 may include deforming a workpiece 218 with a mold 220. Although not shown, the mold 220 may be one of a series of molds each fabricated based on a corresponding computer model of the patient's dentition (e.g., the 3-D digital model 70 may be utilized to produce the mold 220) and each mold captures a target orientation of the patient's teeth during orthodontic treatment. For example, a series of computer models provides incremental steps from T1 to one or more intermediate dentition models and ending with the target dentition T2 are generated and may be used to produce corresponding molds.

In the exemplary embodiment shown in FIG. 14, each mold 220 may include a base 222 that supports a plurality of projections in the form of model teeth 224 that extend from a model gum 226 and defines a gingival margin 228. For example, the teeth 224 and model gum 226 may correspond to the teeth 80 and gingiva 90 in 3-D digital model 70 (FIG. 1). Each model tooth 224 may have an orientation that produces a corresponding cavity 204 in the dental aligner 32 with the gingival margin 228 ideally providing a limiting boundary for the location of the edge 206 of the aligner 32.

Figure 16:
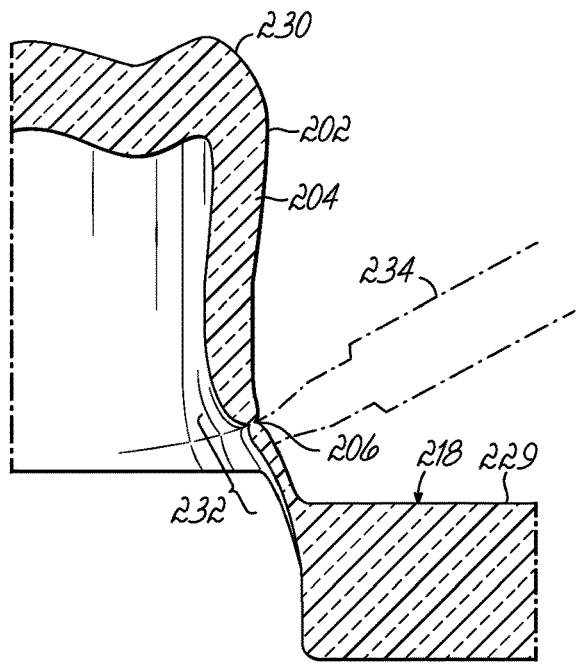
FIG. 16 is a schematic cross-sectional view of a trimming process according to one embodiment of the invention.
Figure 17:
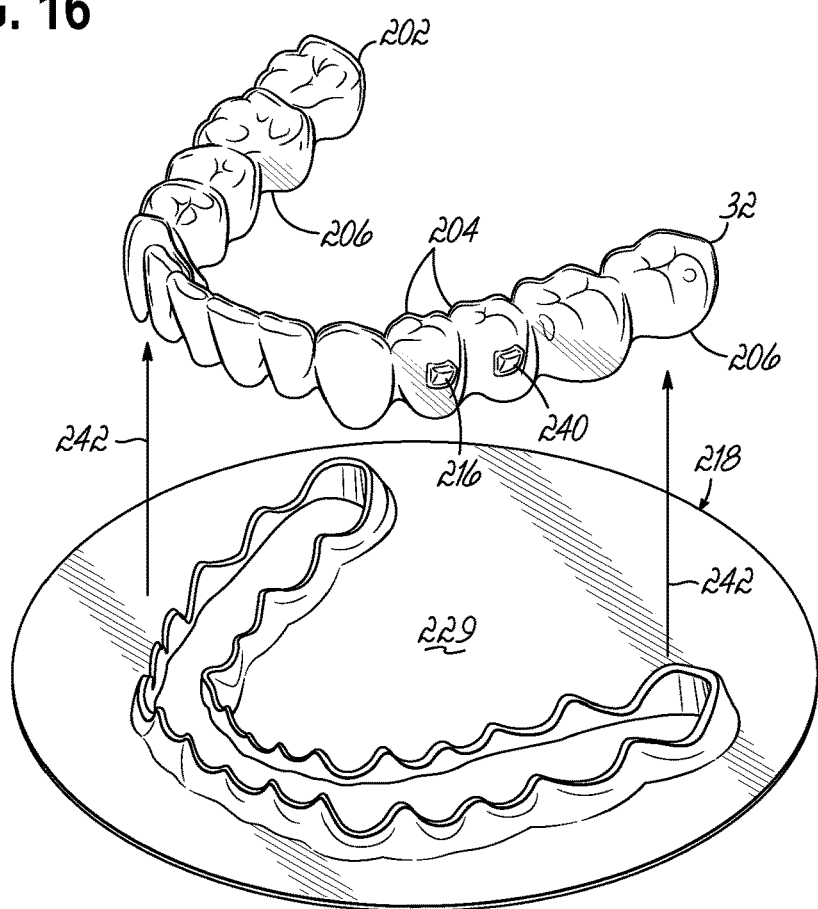
FIG. 17 is a perspective view of separation of an aligner following trimming.

In FIG. 2, forming and trimming each aligner is shown at 214 and may be accomplished with the forming machinery 34 and CNC machinery 26 of the manufacturing system 30 shown in FIG. 1A. In that regard, with reference to FIGS. 14-17, following deforming of the workpiece 218, as is generally shown in FIG. 14, a waste portion 229 of the deformed workpiece 218 is separated from an aligner portion 230 of the workpiece 218 by cutting a region 232 between the two. As is shown in FIGS. 15 and 16, a machine tool 234, which may be coupled to a robot or another machine (e.g., the CNC machinery 26 of FIG. 1 or a milling machine) that is computer controlled, may be used to cut away the region 232 to produce the edge 206 on the aligner 32. The machine tool 234 has a tool radius 236 that defines the edge 206. During machining, the tool 234 follows a tool path 244 to produce the edge 206. According to embodiments of the invention, the tool path 244 is machine code based on the digital trimline, for example, trimline 92. In this way, the edge 206 substantially corresponds to the digital trimline. With reference to FIG. 17, once the machine tool 234 completes removal of the region 232, the aligner 32 is separated from the waste portion 229 of the workpiece 218 according to arrows 242.

Figure 18:
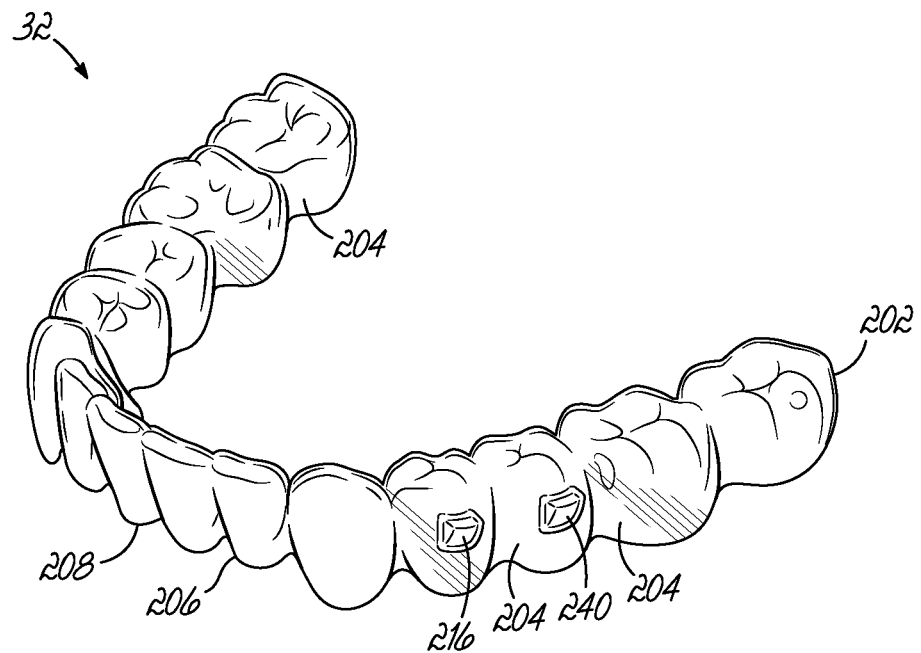
FIG. 18 is a perspective view of an aligner manufactured according to embodiments of the invention.

With reference to FIG. 18, as a result of the method, the aligner 32 includes a hollow shell 202 that is configured to encapsulate one or more crowns of a patient's teeth. The shell 202 is formed with a plurality of cavities 204 that collectively define an edge 206, which defines an opening 208. Each cavity 204 is shaped to receive a specific one of the patient's teeth through the opening 208 during use of the aligner 32. The shell 202 is made of an elastic material in one or more layers and may include one or more receptacles 216 that are configured to receive an attachment 170 (e.g., shown in FIG. 13 and on model in FIG. 14) on the patient's tooth and/or one or more devices 240 in the aligner 32. The receptacle 216 and/or device 240 results in a bulge or discontinuity in the surface of the shell 202. Depending on the placement, the receptacle and/or device may create an issue for machining the edge 206. For this reason, embodiments of the invention address difficulties associated with attachments and/or devices in advance of machining of the workpiece, as is described above.

Although not shown, by way of example only and not limitation, attachments may include an engager, such as a small protrusion of dental bonding material, that is placed at specific locations on selected teeth. The attachment may be any of a variety of shapes including rectangular, square, circular, ellipsoidal, or triangular in shape. The receptacle 216 may be sized to receive at least a portion of the attachment during orthodontic treatment and provide a specific predetermined force via the attachment on the corresponding tooth or on another tooth engaged with the aligner 32 during treatment.

Devices 240 may include sensors, such as pressure sensors, humidity sensors, pH sensors, and any single one of the sensors identified in commonly owned U.S. patent application Ser. No. 15/250,448, filed on Aug. 29, 2016, which is incorporated by reference herein in its entirety, to name only a few. Other examples of devices 240 include light sources. For example, the light source may include an array of diodes (not shown) that are configured to emit infrared light and/or light of other wavelengths. The diodes may be, for example, light emitting diodes (LEDs), surface mounted diodes (SMDs), or Schottky diodes and may be connected in series or in parallel. In another example, the light source may include an organic light emitting diode (OLED); a polymer-light emitting electrochemical cell (LEC); a laser diode, or an optoelectronic device that can source, detect, and control light; or a polymer LED. By way of further example, the device 240 may include a power source.

During orthodontic treatment, the aligner 32 is selectively positioned over the patient's teeth and any attachments 170 and may fit tightly within the receptacle 216 at least partly due to slight differences in the position of one or more of the cavities 204 relative to the corresponding tooth. A forcible contact with the aligner 32 may move the patient's teeth toward a predetermined position according to a patient's treatment plan that may ultimately end at T2. A set of aligners (not shown) may include one or more aligners 32. During orthodontic treatment, each stage of treatment may include an aligner that provides slightly different movement of the patient's teeth. The individual aligners are utilized in a predetermined sequence to complete orthodontic treatment or move the patient's teeth to T2. Accordingly, each aligner in the series may move one or more teeth a prescribed amount. While similar, each aligner is slightly different in shape. Cumulatively, these individual amounts may result in complete treatment of the patient's malocclusion.

As is described above, according to embodiments of the invention, a practitioner implements the computer 12 (e.g., shown in FIGS. 1A and 19) with software capable of generating and manipulating the 3-D digital model 70 in accordance with the system 10 described above.

Figure 19:
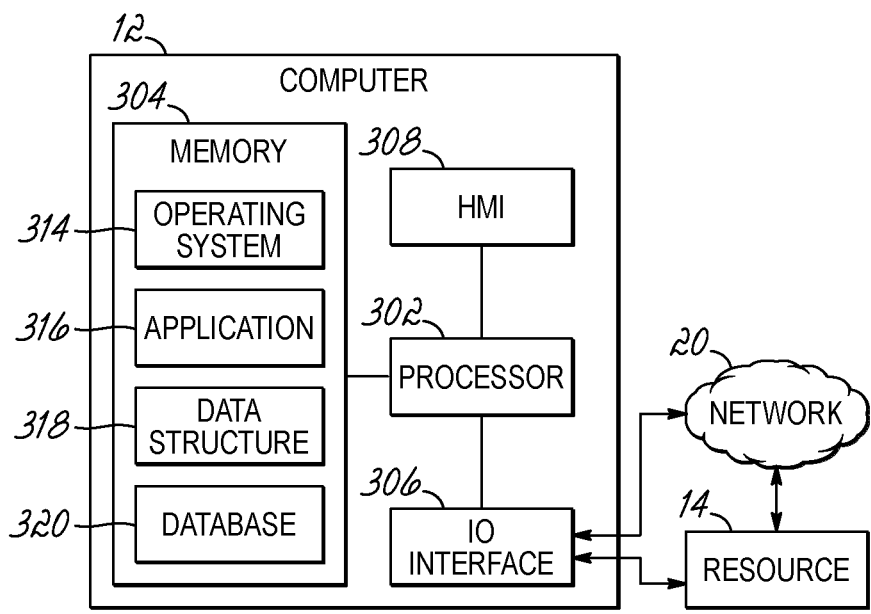
FIG. 19 is a schematic view of a computer device usable with the system of FIG. 1A.

Referring now to FIG. 19, embodiments of the invention described above, or portions thereof, such as the system 10 may be implemented using one or more computer devices or systems, such as exemplary computer 12. The computer 12 may include a processor 302, a memory 304, an input/output (I/O) interface 306, and a Human Machine Interface (HMI) 308. The computer 300 may also be operatively coupled to one or more external resources 310, such as an intra-oral scanner and CBCT system or machining center, via a network 312 and/or I/O interface 306. External resources may include, but are not limited to, servers, databases, mass storage devices, peripheral devices, cloud-based network services, or any other resource that may be used by the computer 300.

The processor 302 may include one or more devices selected from microprocessors, micro-controllers, digital signal processors, microcomputers, central processing units, field programmable gate arrays, programmable logic devices, solid state machines, logic circuits, analog circuits, digital circuits, or any other devices that manipulate signals (analog or digital) based on operational instructions that are stored in memory 304. Memory 304 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 302 may operate under the control of an operating system 314 that resides in memory 304. The operating system 314 may manage computer resources so that computer program code embodied as one or more computer software applications or algorithms, such as an application 316 residing in memory 304, may have instructions executed by the processor 302. In an alternative embodiment, the processor 302 may execute the application 316 directly, in which case the operating system 314 may be omitted. One or more data structures 318, for example the 3-D digital model 70, may also reside in memory 304, and may be used by the processor 302, operating system 314, or application 316 and is manipulated by the clinician.

The I/O interface 306 may provide a machine interface that operatively couples the processor 302 to other devices and systems, such as the external resource 310 or the network 20. The application 316 may thereby work cooperatively with the external resource 310 or network 20 by communicating via the I/O interface 306 to provide the various features, functions, applications, processes, or modules comprising embodiments of the invention. The application 316 may also have program code that is executed by one or more external resources 310, or otherwise rely on functions or signals provided by other system or network components external to the computer 12. Indeed, given the nearly endless hardware and software configurations possible, persons having ordinary skill in the art will understand that embodiments of the invention may include applications that are located externally to the computer 12, distributed among multiple computers or other external resources 310, or provided by computing resources (hardware and software) that are provided as a service over the network 312, such as a cloud computing service.

The HMI 308 may be operatively coupled to the processor 302 of computer 300 in a known manner to allow a practitioner to interact directly with the computer 300 to, for example, operate user interface 120. The HMI 308 may include video or alphanumeric displays, a touch screen, a speaker, and any other suitable audio and visual indicators capable of providing data to the user. The HMI 308 may also include input devices and controls such as an alphanumeric keyboard, a pointing device, keypads, pushbuttons, control knobs, microphones, etc., capable of accepting commands or input from the user and transmitting the entered input to the processor 302.

A database 320 may reside in memory 304 and may be used to collect and organize data used by the various systems and modules described herein. The database 320 may include data and supporting data structures, for example 3-D digital model 70 and/or predetermined parameters 36, that store and organize the data. In particular, the database 320 may be arranged with any database organization or structure including, but not limited to, a relational database, a hierarchical database, a network database, or combinations thereof. A database management system in the form of a computer software application executing as instructions on the processor 302 may be used to access the information or data stored in records of the database 320 in response to a query, where a query may be dynamically determined and executed by the operating system 314, other applications 316, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures (e.g., the 3-D digital model 70), program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an orthodontic appliance including instructions that implement the functions, acts, and/or operations specified in the flow-chart, sequence diagram, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-chart, sequence diagram, and/or block diagram of FIG. 2 may be re-ordered, processed serially, and/or processed concurrently consistent with embodiments of the invention. Moreover, any of the flow-chart, sequence diagram, and/or block diagram of FIG. 2 may include more or fewer blocks than those illustrated consistent with embodiments of the invention.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A computer-implemented method of defining a trimline for use in the manufacturing of an aligner, the method comprising:
   receiving a 3-D digital model of a patient's teeth projecting from a modeled gingiva;
   placing a margin point proximate a gingival margin at each tooth on at least one jaw in the 3-D digital model;
   generating a trimline connecting the plurality of margin points, the trimline including:
      (i) a first tooth curve associated with a first model tooth,
      (ii) a second tooth curve associated with a second model tooth, and
      (iii) a connector curve in an interproximal region in the 3-D digital model and connecting the first tooth curve to the second tooth curve,
   wherein placing the margin point includes placing a first margin point of the plurality of margin points defining a first location on the first tooth curve and placing a second margin point of the plurality of margin points defining a second location on the second tooth curve;
   adding at least one control point on the connector curve to define a location on the connector curve between the first margin point and the second margin point;
   generating machine code from the trimline for a corresponding aligner;
   using the machine code to control a trimming process of a machine to produce the aligner having an edge correlating to the trimline.

2. The method of claim 1 wherein during placing, at least one margin point of the plurality of margin points is placed at a gingival-occlusal height of a gingival zenith of the gingival margin of at least one tooth.

3. The method of claim 1 wherein the first model tooth in the 3-D digital model cooperates with the modeled gingiva to define a line around the first model tooth and wherein the connector curve is connected to the first-tooth curve at a transition point, the first tooth curve being defined in at least one of curvature and location by the line around the first model tooth and passing through the first margin point.

4. The method of claim 1 wherein the trimline is defined by a spline between the first margin point and the at least one control point.

5. The method of claim 4 further including adding a vector on the trimline between the at least one control point and the first margin point, wherein the vector is configured to alter the curvature of the spline.

6. The method of claim 5 wherein the spline is a Bèzier curve.

7. The method of claim 1 further including moving the at least one control point occlusally relative to the first margin point and the second margin point and wherein the trimline follows the at least one control point.

8. The method of claim 7 wherein the at least one control point is in the interproximal region.

9. The method of claim 7 wherein, following moving the at least one control point, validating the trimline between the first margin point and the second margin point, including through the at least one control point, against at least one predetermined parameter.

10. The method of claim 9 wherein the at least one predetermined parameter includes one or more of a minimum clinical radius, a minimum tool radius, and a minimum labial-lingual distance.

11. The method of claim 9 wherein after validating, determining that the trimline is invalid.

12. The method of claim 11 wherein after determining, moving at least one of the at least one control point, the first margin point, and the second margin point or a combination thereof and repeating validating.

13. The method of claim 1 further including moving all the margin points occlusally or gingivally by a margin parameter.

14. The method of claim 1 further including moving the at least one control point relative to the margin point.

15. A system for defining a trimline for use in the manufacturing of an aligner, the system comprising:
a processor; and
non-transitory memory including program code; the processor configured by the program code to:
receive a 3-D digital model of a patient's teeth projecting from a modeled gingiva;
place a margin point proximate a gingival margin at each tooth on a jaw in the 3-D digital model;
generate a trimline connecting the plurality of margin points, the trimline including
(i) a first tooth curve associated with a first model tooth,
(ii) a second tooth curve associated with a second model tooth, and
(iii) a connector curve in an interproximal region in the 3-D digital model and connecting the first tooth curve to the second tooth curve,
wherein a first margin point of the plurality of margin points defines a first location on the first tooth curve and a second margin point of the plurality of margin points defines a second location on the second tooth curve;
add at least one control point on the connector curve to define a location on the connector curve between the first margin point and the second margin point;
generate machine code from the trimline for a corresponding aligner;
use the machine code to control a trimming process of a machine to produce the aligner having an edge correlating to the trimline.

16. The system of claim 15 wherein during placement, at least one margin point of the plurality of margin points is placed at a gingival-occlusal height of a gingival zenith of the gingival margin of at least one tooth.

17. The system of claim 15 wherein the first model tooth in the 3-D digital model cooperates with the modeled gingiva to define a line around the first model tooth and wherein the connector curve is connected to the first tooth curve at a transition point, the first tooth curve being defined in at least one of curvature or location by the line around the first model tooth and passing through the first margin point.

18. The system of claim 15 wherein the processor is configured by the program code to:
define the trimline as a spline between the first margin point and the at least one control point.

19. The system of claim 18 wherein the processor is configured by the program code to:
add a vector on the trimline between the at least one control point and the first margin point, wherein the vector is configured to alter the curvature of the spline.

20. The system of claim 18 wherein the spline is a Bèzier curve.

21. The system of claim 15 wherein the processor is configured by the program code to:
move the at least one control point occlusally relative to the first margin point and the second margin point and wherein the trimline follows the at least one control point.

22. The system of claim 21 wherein the processor is configured by the program code to:
validate the trimline against at least one predetermined parameter after moving the at least one control point.

23. The system of claim 22 wherein the at least one predetermined parameter includes one or more of a minimum clinical radius, a minimum tool radius, and a minimum labial-lingual distance.

24. The system of claim 21 wherein the processor is configured by the program code to:
indicate that the trimline is invalid after validating.

25. The system of claim 15 wherein the processor is configured by the program code to:
move all the margin points occlusally or gingivally by a margin parameter.

26. The system of claim 15 further including a manufacturing system in which the machine code is usable to form the edge of the aligner.

27. The system of claim 15 wherein the processor is configured by the program code to:
measure a location of an incisal surface of a molar relative to an adjacent molar.

28. The system of claim 27 wherein the processor is configured by the program code to:
extend the trimline over the incisal surface of the molar.

29. The system of claim 15 wherein the process is configured by the program code to:
move the at least one control point relative to the margin point.

30. A computer-implemented method of defining a trimline for use in the manufacturing of an aligner, the method comprising:
    receiving a 3-D digital model of a patient's teeth projecting from a modeled gingiva;
    placing a margin point proximate a gingival margin at each tooth on at least one jaw in the 3-D digital model;
    placing a control point in between adjacent margin points in the 3-D digital model;
    moving the control point relative to at least one margin point;
    generating a trimline connecting the margin points and control points;
    generating machine code from the trimline for a corresponding aligner; and
    using the machine code to control a trimming process of a machine to produce the aligner having an edge correlating to the trimline.

31. The method of claim 30 wherein during placing, at least one margin point of the plurality of margin points is placed at a gingival-occlusal height of a gingival zenith of the gingival margin of at least one tooth.

32. The method of claim 30 wherein at least one tooth in the 3-D digital model cooperates with the modeled gingiva to define a line around the at least one tooth and wherein the trimline includes at least one tooth curve and at least one connector curve connected to the at least one tooth curve at a transition point, the tooth curve being defined in at least one of curvature and location by the line around the at least one tooth and passing through at least one margin point.

33. The method of claim 30 wherein the trimline is defined by a spline between at least one margin point of the two margin points and the at least one control point.

34. The method of claim 33 further including adding a vector on the trimline between the at least one control point and the at least one margin point, wherein the vector is configured to alter the curvature of the spline.

35. The method of claim 33 wherein the spline is a Bezier curve.

36. The method of claim 30 wherein the control point is in an interproximal region between adjacent teeth.

37. The method of claim 30 further including moving the margin points by a margin parameter.

38. A computer-implemented method of defining a trimline for use in the manufacturing of an aligner, the method comprising:
    receiving a 3-D digital model of a patient's teeth projecting from a modeled gingiva, wherein the 3-D digital model of teeth includes at least one molar;
    placing a margin point proximate a gingival margin at each tooth on at least one jaw in the 3-D digital model;
    adding a control point on an occlusal surface between cusps of the at least one molar;
    generating a trimline connecting the plurality of margin points and the control point;
    generating machine code from the trimline for a corresponding aligner; and
    using the machine code to control a trimming process of a machine to produce the aligner having an edge correlating to the trimline.

39. A computer-implemented method of defining a trimline for use in the manufacturing of an aligner, the method comprising:
    receiving a 3-D digital model of a patient's teeth projecting from a modeled gingiva;
    placing a margin point proximate a gingival margin at each tooth on at least one jaw in the 3-D digital model;
    generating a trimline connecting the plurality of margin points;
    adding at least one control point between two margin points;
    moving the at least one control point occlusally relative to the two margin points and wherein the trimline follows the control point; and
    following moving the at least one control point, validating the trimline between the two margin points, including through the at least one control point, against at least one predetermined parameter,
    wherein the at least one predetermined parameter includes one or more of a minimum clinical radius, a minimum tool radius, and a minimum labial-lingual distance;
    generating machine code from the trimline for a corresponding aligner; and
    using the machine code to control a trimming process of a machine to produce the aligner having an edge correlating to the trimline.

40. A computer-implemented method of defining a trimline for use in the manufacturing of an aligner, the method comprising:
    receiving a 3-D digital model of a patient's teeth projecting from a modeled gingiva;
    placing a first margin point at a gingival-occlusal height of a gingival zenith of a gingival margin on a first tooth in the 3-D digital model;
    placing a second margin point at a gingival-occlusal height of a gingival zenith of a gingival margin on a second tooth in the 3-D digital model;
    generating a trimline connecting the plurality of margin points, wherein the trimline generated is a straightest possible line that connects the first margin point and the second margin point;
    generating machine code from the trimline for a corresponding aligner; and
    using the machine code to control a trimming process of a machine to produce the aligner having an edge corresponding to the trimline.

* * * * *

UNITED STATES PATENT AND TRADEMARK OFFICE
CERTIFICATE OF CORRECTION

PATENT NO. : 12,197,186 B2
APPLICATION NO. : 17/126632
DATED : January 14, 2025
INVENTOR(S) : Yevgeniy Sirovskiy et al.

It is certified that error appears in the above-identified patent and that said Letters Patent is hereby corrected as shown below:

In the Specification

In Column 11, Lines 1-2, change "By way of example only, and not limitation, the set of predetermined parameters include one or more requirements" to -- By way of example only, and not limitation, the set of predetermined parameters includes one or more requirements --.

In the Claims

In Column 20, Claim 15, Lines 4-5, change "generate machine code from the trimline for a corresponding aligner;" to -- generate machine code from the trimline for a corresponding aligner; and --.

In Column 20, Claim 29, Lines 62-63, change "The system of claim 15 wherein the process is configured by the program code to:" to -- The system of claim 15 wherein the processor is configured by the program code to: --.

In Column 22, Claim 40, Lines 51-53, change "and using the machine code to control a trimming process of a machine to produce the aligner having an edge corresponding to the trimline." to -- and using the machine code to control a trimming process of a machine to produce the aligner having an edge correlating to the trimline. --.

Signed and Sealed this
Thirteenth Day of May, 2025

Coke Morgan Stewart
*Acting Director of the United States Patent and Trademark Office*